US012802004B2

(12) United States Patent
Scheibelhut et al.

(10) Patent No.: US 12,802,004 B2
(45) Date of Patent: Nov. 17, 2026

(54) TRIGGERING EXPERT ASSISTANCE FOR ITEM COLLECTION BASED ON USER PREFERENCE AND FULFILLMENT EXPERTISE PREDICTED BY A MACHINE-LEARNING MODEL

(71) Applicant: Maplebear Inc., San Francisco, CA (US)

(72) Inventors: Brent Scheibelhut, Toronto (CA); Mark Oberemk, Toronto (CA); Naval Shah, Toronto (CA); Madeline Mesard, New York, NY (US); Charles Wesley, San Diego, CA (US); Akshay Bagai, Oakville (CA)

(73) Assignee: Maplebear Inc., San Francisco, CA (US)

( * ) Notice: Subject to any disclaimer, the term of this patent is extended or adjusted under 35 U.S.C. 154(b) by 168 days.

(21) Appl. No.: 18/444,573

(22) Filed: Feb. 16, 2024

(65) Prior Publication Data

US 2025/0265515 A1 Aug. 21, 2025

(51) Int. Cl.
*G06Q 10/0631* (2023.01)
*G06Q 30/0601* (2023.01)

(52) U.S. Cl.
CPC ................ *G06Q 10/063112* (2013.01); *G06Q 10/063114* (2013.01); *G06Q 30/0625* (2013.01); *G06Q 30/0635* (2013.01); *G06Q 30/0641* (2013.01)

(58) Field of Classification Search
CPC ............... G06Q 10/06; G06Q 10/0631; G06Q 10/0633; G06Q 10/0635; G06Q 10/06316;

(Continued)

(56) References Cited

U.S. PATENT DOCUMENTS

2014/0136255 A1* 5/2014 Grabovski ..... G06Q 10/063114 705/7.14
2022/0253792 A1* 8/2022 Rajkhowa ........ G06Q 10/06316
(Continued)

OTHER PUBLICATIONS

Rayavel et al., Optimizing User Satisfaction and Streamlining Operations in Online Retail Using CNN Algorithm, Jan. 24, 2024, 2024 International Conference on Intelligent and Innovative Technologies in Computing, Electrical, and Electronics, pp. 1-7 (Year: 2024).*

(Continued)

*Primary Examiner* — Robert D Rines

(74) *Attorney, Agent, or Firm* — Fenwick & West LLP

(57) ABSTRACT

An online concierge system receives an order including one or more items from a client device associated with a user and retrieves user data for the user. The system accesses and applies a machine-learning model to predict a measure of preference of the user associated with each item category associated with the items based on the user data and identifies an item associated with at least a threshold predicted measure of preference. The system retrieves picker data for a picker assigned to collect the items and predicts a level of expertise of the picker associated with collecting the identified item based on the picker data. If the predicted level of expertise is less than a threshold, the system identifies an expert picker based on picker data for the expert picker and sends a prompt to a client device associated with the expert picker to assist with collecting the identified item.

14 Claims, 8 Drawing Sheets

(58) Field of Classification Search
CPC ....... G06Q 10/06375; G06Q 10/06393; G06Q 10/0639; G06Q 10/06395; G06Q 10/103; G06Q 30/0601; G06Q 30/0613; G06Q 30/0617; G06Q 30/06211; G06Q 30/06311; G06Q 30/06312; G06Q 10/08; G06Q 10/087; G06F 8/65; G06F 21/50; G06F 21/57; G06F 21/572; G06F 21/577; G06F 21/60; G06F 21/604; G06F 21/606; G06F 16/2379; G06F 16/252; G06F 16/2246; G06F 40/103; G06F 40/186; H04L 63/14; H04L 63/1408; H04L 63/1416; H04L 63/1433; H04L 63/1441; H04L 63/145; H04L 63/08; H04L 12/1813; H04L 51/04; G06N 20/00; G06N 3/0475; G06N 3/0455
See application file for complete search history.

(56) References Cited

U.S. PATENT DOCUMENTS

| | | | | |
|---|---|---|---|---|
| 2023/0046686 | A1* | 2/2023 | Johnson | G06Q 30/0278 |
| 2023/0237431 | A1* | 7/2023 | Glaser | H04W 4/029<br>705/28 |
| 2023/0326306 | A1* | 10/2023 | Ziegler | G06Q 10/087<br>705/16 |
| 2025/0005516 | A1* | 1/2025 | Francis | G06Q 10/087 |

OTHER PUBLICATIONS

Sirohi et al., Leveraging knowledge of Previous Baskets to Anticipate online Buyer Behaviour, Nov. 23, 2023, 2023 International Conference on Advances in Computation, Communication and Information Technology (ICAICCIT) (2023, pp. 968-973) (Year: 2023).*

* cited by examiner

TRIGGERING EXPERT ASSISTANCE FOR ITEM COLLECTION BASED ON USER PREFERENCE AND FULFILLMENT EXPERTISE PREDICTED BY A MACHINE-LEARNING MODEL

BACKGROUND

Online concierge systems provide users with the convenience of placing orders that are assigned to pickers who service the orders on their behalf and deliver the orders to the users. For example, suppose that a user places an order with an online concierge system, in which the order includes several items to be collected from a retailer location and specifies a delivery location for the order and a delivery timeframe during which the order is to be delivered. In this example, once the order is assigned to a picker, the picker drives to the retailer location, collects the items, and delivers them to the delivery location within the delivery timeframe. When placing orders with online concierge systems, users may have certain preferences associated with types of items included in the orders. In the above example, if the order includes bananas, the user may prefer overripe bananas, which may be specified in instructions provided by the user.

However, due to their unfamiliarity with various types of items or retailer locations, pickers to which orders are assigned may lack the expertise required to collect items to the satisfaction of users who placed the orders. In the above example, if the picker is unfamiliar with the retailer location, they may have trouble finding overripe bananas, while if the picker is a new picker and never purchases overripe bananas, they may collect bananas that are not ripe enough. Continuing with the above example, when delivered to the user, if the order does not include any bananas or if the order includes bananas that are not ripe enough, the user may be dissatisfied and may then request a refund, purchase the overripe bananas themselves, etc. As a result of this lack of expertise, users may place fewer orders or refrain from placing orders with online concierge systems altogether if they are dissatisfied with the items that are collected.

SUMMARY

In accordance with one or more aspects of the disclosure, to improve customer satisfaction and the efficiency with which ordered items are collected, an online concierge system prompts experts to provide assistance with collecting items included in orders placed with the online concierge system. More specifically, an online concierge system receives an order including a set of items from a user client device associated with a user and retrieves a set of user data for the user. The online concierge system then accesses and applies a machine-learning model to predict a measure of preference of the user associated with each item category associated with the set of items based on the set of user data and identifies an item associated with at least a threshold predicted measure of preference. The online concierge system assigns a picker to collect the set of items and retrieves a set of picker data for the assigned picker. The online concierge system predicts a level of expertise of the assigned picker associated with collecting the identified item based on the set of picker data and determines whether the predicted level of expertise is less than a threshold predicted level of expertise. Responsive to determining the predicted level of expertise is less than the threshold predicted level of expertise, the online concierge system retrieves picker data for a set of pickers, identifies an expert picker based on a set of picker data for the expert picker, and sends a prompt to a picker client device associated with the expert picker to assist the assigned picker with collecting the identified item.

DETAILED DESCRIPTION

Figure 1:
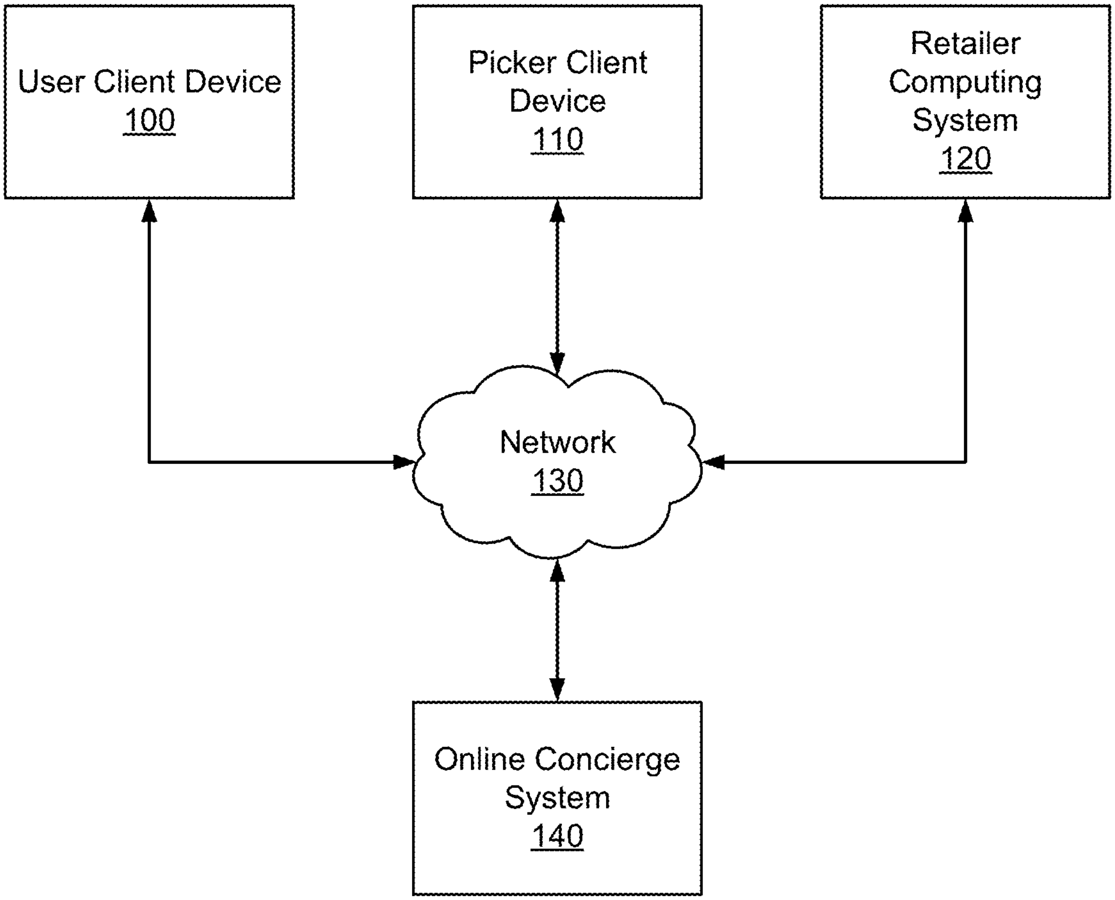
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or a desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, refers to a good or product that may be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer location. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer location, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Furthermore, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from a user client device 100 through the network 130. The online concierge system 140 selects a picker to service the user's order and transmits the order to a picker client device 110 associated with the picker. The picker collects the ordered items from a retailer location and delivers the ordered items to the user. The online concierge system 140 may charge a user for the order and provide portions of the payment from the user to the picker and the retailer. As an example, the online concierge system 140 may allow a user to order groceries from a grocery store retailer. The user's order may specify which groceries they want delivered from the grocery store and the quantities of each of the groceries. The user's client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
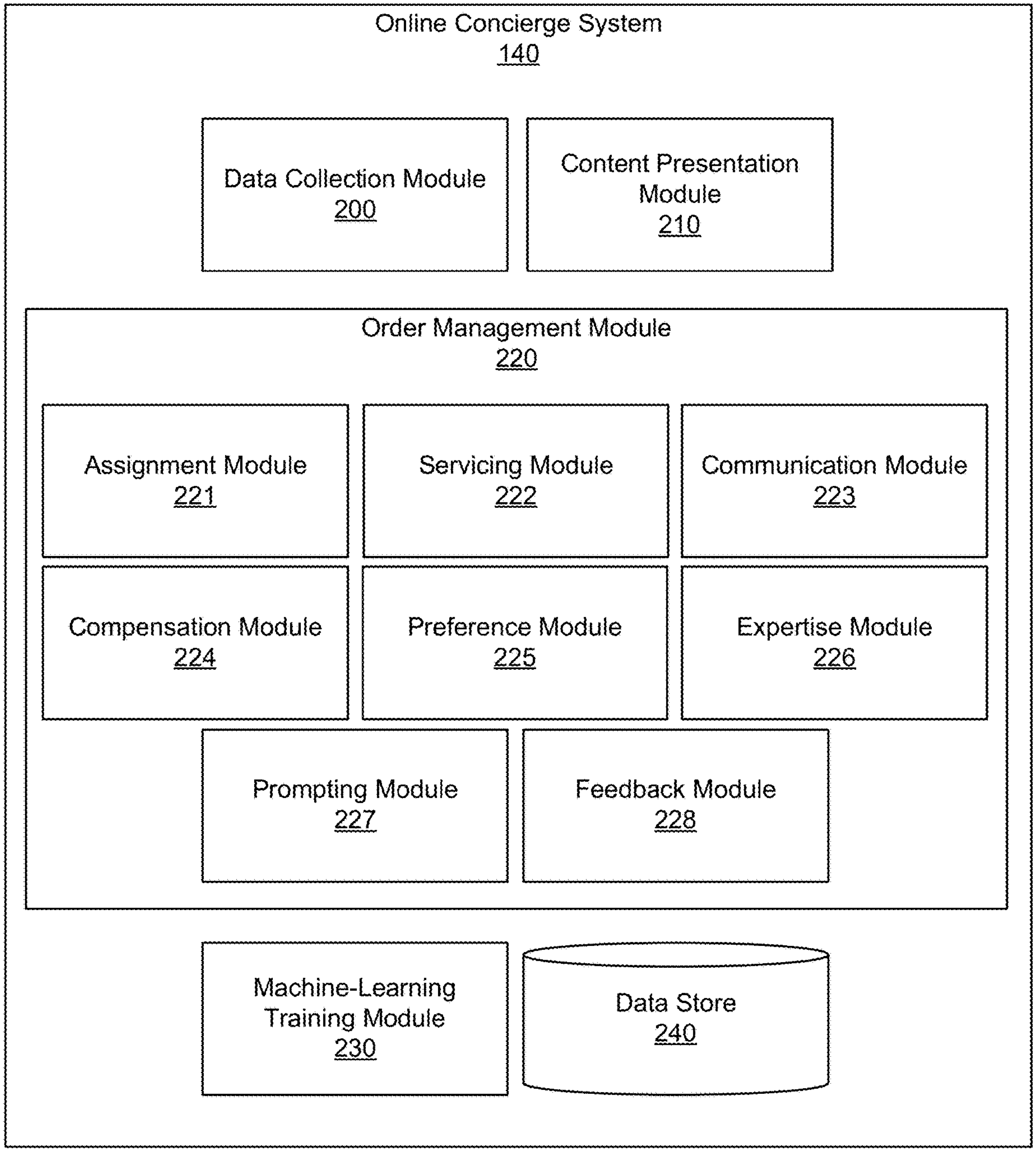
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

The data collection module 200 collects user data, which is information or data describing characteristics of a user. User data may include a user's name, address, shopping preferences, favorite items, dietary restrictions/preferences, or stored payment instruments. User data also may include demographic information associated with a user (e.g., age, gender, geographical region, etc.) or household information associated with the user (e.g., a number of people in the user's household). The user data also may include default settings established by the user, such as a default retailer/retailer location, payment instrument, delivery location, or delivery timeframe. User data also may include session-based information associated with a user, such as actions performed by the user during a session of the user with the online concierge system 140 (e.g., types of actions and times when the actions were performed), items included in a shopping list associated with the user during the session, content presented to the user during the session, or any other suitable types of session-based information.

User data further may include historical information (e.g., historical order or interaction information) associated with a user. For example, user data may describe previous orders placed by a user with the online concierge system 140 and may include information describing one or more items included in each order (e.g., size, brand, quantity, etc.), as well as a review, a rating, or instructions associated with each order provided by the user. In the above example, the user data also may include a number or a percentage of items in an item category included in each order and information indicating whether one or more items were removed from or replaced in each order, whether each order was associated with an issue, a complaint, a refund, a cancellation, etc. As an additional example, user data may describe previous interactions by a user with items, recipes, or other types of content (e.g., coupons, advertisements, etc.) presented by the online concierge system 140 and may describe the items (e.g., item categories, prices, etc. associated with the items), the recipes (e.g., ingredients of the recipes), or the other types of content (e.g., items associated with coupons, advertisements, etc.). In this example, the user data may also describe the types of interactions and the times of the interactions (e.g., a timestamp associated with each interaction).

User data also may include a measure of preference of a user associated with an item category. As described below, an item category is a set of items that are a similar type of item. A measure of preference of a user associated with an item category may describe an importance of an attribute (e.g., size, color, weight, etc.) of a set of items included in the item category to the user or an importance of an availability of the set of items to the user. For example, a measure of preference of a user associated with a "banana" item category may describe the user's preference for green, overripe, or organic bananas. As an additional example, a measure of preference of a user associated with an item category describing an importance of an availability of a set of items included in the item category to the user is likely to be higher if the user is making a recipe that requires a specific ingredient matching the item category than if the user is not making the recipe. A measure of preference of a user associated with an item category may be expressed as a value (e.g., a score, a percentage, etc. that is proportional to the measure of preference) or in any other suitable way. A measure of preference of a user associated with an item category may be a common or a universal preference (e.g., the freshest possible fish for a freshness attribute associated with a "raw fish" item category). Alternatively, a measure of preference of a user associated with an item category may be a personal preference of the user (e.g., a certain amount of marbling for a marbling attribute associated with a "steak" item category). A measure of preference of a user associated with an item category may be received from the user (e.g., via a survey, a questionnaire, etc. sent to a user client device 100 associated with the user) or predicted, as described below. The data collection module 200 may collect the user data from sensors on the user client device 100, one or more components of the order management module 220 (described below), or based on the user's interactions with the online concierge system 140.

The data collection module 200 also collects item data, which is information or data identifying and describing items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. For example, items such as apples, oranges, lettuce, and cucumbers may be included in a "produce" item category. As an additional example, items such as bread, pasta, and cookies that are gluten-free may be included in a "gluten-free" item category, while items such as tortilla chips and tofu that are non-GMO may be included in a "non-GMO" item category. Furthermore, in various embodiments, an item may be included in multiple categories. For example, croissants may be included in a "croissant" item category, a "pastry" item category, and a "bakery" item category. The item categories may be human-generated and human-populated with items. The item categories also may be generated automatically by the online concierge system 140 (e.g., using a clustering algorithm).

The data collection module 200 also collects picker data, which is information or data describing characteristics of pickers. For example, the picker data for a picker may include the picker's name, the picker's location, how often or how long the picker has serviced orders for the online concierge system 140, a user rating for the picker, the retailer locations from which the picker has collected items, or the picker's previous shopping history. Additionally, the picker data may include preferences expressed by the picker, such as their preferred retailers for collecting items, how far they are willing to travel to deliver items to a user, how many items they are willing to collect at a time, timeframes within which the picker is willing to service orders, or payment information by which the picker is to be paid for servicing orders (e.g., a bank account). Picker data also may describe a level of expertise of a picker associated with collecting an item or a level of helpfulness of assistance provided by a picker with collecting an item. A level of expertise of a picker associated with collecting an item or a level of helpfulness of assistance provided by a picker with collecting an item may be expressed as a value (e.g., a score, a percentage, etc. that is proportional to the level of expertise/helpfulness) or in any other suitable way. As described below a level of expertise of a picker associated with collecting an item may be predicted, while a level of helpfulness of assistance provided by a picker with collecting an item may be received from a picker client device 110 associated with another picker.

In embodiments in which picker data includes a picker's previous shopping history, the picker data also may include various types of information associated with each order including a set of items collected by the picker. For example, picker data for a picker may include a review for an order including a set of items collected by the picker, a complaint, a refund, an issue, or a cancellation associated with the order, or a number or a percentage of items in an item category included in the order. In the above example, the picker's previous shopping history also may describe a removal or a replacement of an item included in the order or a rate at which one or more items included in the order were found by the picker (e.g., item(s) associated with at least a threshold predicted availability predicted using an availability model, described below). In this example, the picker's previous shopping history further may describe an amount of time required by the picker to collect an item included in an order (e.g., based on a progress of the picker). In the above example, the picker's previous shopping history further may describe an amount of time required by the picker to collect a set of items included in an item category (e.g., based on a progress of the picker or a total amount of time required by the picker to collect the items included in an order and a percentage of items included in the order associated with the item category). The data collection module 200 collects picker data from sensors of the picker client device 110, one or more components of the order management module 220 (described below), or from the picker's interactions with the online concierge system 140.

Additionally, the data collection module 200 collects order data, which is information or data describing characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, a rating or a review that the user gave the delivery of the order or a complaint, a refund, an issue, or a cancellation associated with the order. Order data also may include a number or a percentage of items in an item category included in an order, information describing a replacement or a removal of an item included in the order, or any other suitable types of information that may be associated with an order. In some embodiments, the order data includes user data for users associated with the order, such as user data for a user who placed the order or picker data for a picker who serviced the order.

The data collection module 200 also may collect recipe data, which is information or data describing characteristics of a recipe. Recipe data for a recipe may include a set of ingredients included in the recipe, an amount or a quantity of each ingredient used to make the recipe, a set of equipment used to make the recipe (e.g., a rolling pin, a food processor, etc.), a set of instructions for making the recipe, or an amount of time required to make the recipe. Recipe data for a recipe also may include additional types of information, such as a set of nutritional information associated with the recipe, a number of servings the recipe yields, a cuisine (e.g., American, Thai, Italian, etc.) associated with the recipe, a meal (e.g., brunch, dessert, etc.) associated with the recipe, or any other suitable types of information that may be associated with a recipe. The data collection module 200 may collect recipe data from a user client device 100 associated with a user of the online concierge system 140, a third-party system (e.g., a website or an application), or any other suitable source.

The data collection module 200 also may collect retailer data, which is information or data identifying and describing characteristics of a retailer location. Retailer data for a retailer location may include information identifying a retailer that operates the retailer location, a geographical location of the retailer location, and hours of operation for the retailer location. Retailer data for a retailer location also may include information describing each employee or other individual who may be available to assist with collecting items at the retailer location. Examples of such types of information include: their name, work schedule/availability, departments in which they have worked or with which they are familiar, a length of time they have worked/assisted at the retailer location or in each department, their rating (e.g., provided by customers, supervisors, etc.), or their level of expertise associated with collecting an item. Additional examples of such types of information include: information describing payment information (e.g., a bank account) or a client device associated with each employee/individual, a level of helpfulness of assistance provided by the employee/individual with collecting an item, or any other suitable types of information. Retailer data further may include information associated with an order including a set of items collected with the assistance of an employee or other individual at a retailer location, such as a review for the order, a complaint, a refund, an issue, or a cancellation associated with the order, a number or a percentage of items in an item category included in the order, etc. The data collection module 200 collects retailer data from the retailer computing system 120, sensors of client devices associated with employees or other individuals associated with a retailer location, one or more components of the order management module 220 (described below), or from the employees'/individuals' interactions with the online concierge system 140.

In some embodiments, the data collection module 200 also may derive information from other data stored in the data store 240 and may store this derived information in association with the data from which it was derived. Information derived by the data collection module 200 may indicate whether a review for an order is a positive or a negative review, whether a review or a set of instructions associated with an order applies to a particular item or item category, or any other suitable types of information. For example, the data collection module 200 may derive information indicating that a user prefers an attribute corresponding to a green color that applies to a "banana" item category if instructions associated with an order states: "I only want green bananas." As an additional example, if a review for an order states: "Great job selecting the spinach!" the data collection module 200 may derive information from the review indicating that the review is positive and applies to an item corresponding to spinach. As an additional example, the data collection module 200 may derive information indicating that a review is positive and applies to a "produce" item category if the review states: "Great job on the order!" and at least a threshold percentage of items included in the order are in the "produce" item category. Alternatively, in the above example, the data collection module 200 may derive information indicating that a review is negative and applies to a "red peppers" item category and a "tomatoes" item category if the review states: "Asked for red peppers but got tomatoes." As yet another example, if a review for an order states: "Great job replacing the Gala apples with Fuji apples!" the data collection module 200 may derive information indicating that the review is positive and applies to an "apple" item category. The data collection module 200 may derive information using various techniques (e.g., by applying natural language processing (NLP) techniques to text associated with an order, by applying computer-vision techniques to images associated with an order, etc.).

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. The ordering interface may include interactive elements (e.g., sliders, text fields, buttons, etc.) that allow the user to provide instructions associated with their order. For example, if the content presentation module 210 populates the ordering interface with bananas that the user may select for adding to their order, the ordering interface may include images of bananas of different ripeness and a slider below the images that allows the user to indicate their preference for a specific ripeness or a text field that allows the user to describe their preference for a specific ripeness. In the above example, the ordering interface also may include buttons that allow the user to specify a number of bananas to add to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. In this example, the content presentation module 210 then displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. Components of the order management module 220 include: an assignment module 221, a servicing module 222, a communication module 223, a compensation module 224, a preference module 225, an expertise module 226, a prompting module 227, and a feedback module 228, which are further described below. The assignment module 221 receives orders from user client devices 100 and assigns the orders to pickers for service based on picker data. For example, the assignment module 221 assigns an order to a picker based on the picker's location and the retailer location from which the ordered items are to be collected. The assignment module 221 may also assign an order to a picker based on how many items are in the order, a vehicle operated by the picker, the delivery location, the picker's preferences for how far to travel to deliver an order, the picker's ratings by users, or how often the picker agrees to service an order.

In some embodiments, the assignment module 221 determines when to assign an order to a picker based on a delivery timeframe requested by the user who placed the order. The assignment module 221 computes an estimated amount of time that it would take for a picker to collect the items for an order and deliver the ordered items to the delivery location for the order. The assignment module 221 assigns the order to a picker at a time such that, if the picker immediately services the order, the picker is likely to deliver the order at a time within the requested timeframe. Thus, when the assignment module 221 receives an order, the assignment module 221 may delay in assigning the order to a picker if the requested timeframe is far enough in the future (i.e., the picker may be assigned at a later time and is still predicted to meet the requested timeframe).

When the assignment module 221 assigns an order to a picker, the servicing module 222 transmits the order to the picker client device 110 associated with the picker. The servicing module 222 may also transmit navigation instructions from the picker's current location to the retailer location associated with the order. If the order includes items to collect from multiple retailer locations, the servicing module 222 identifies the retailer locations to the picker and may also specify a sequence in which the picker should visit the retailer locations.

The servicing module 222 may track the location of the picker through the picker client device 110 to determine when the picker arrives at the retailer location. When the picker arrives at the retailer location, the servicing module 222 transmits the order to the picker client device 110 for display to the picker. As the picker uses the picker client device 110 to collect items at the retailer location, the servicing module 222 receives item identifiers for items that the picker has collected for the order. In some embodiments, the servicing module 222 receives images of items from the picker client device 110 and applies computer-vision techniques to the images to identify the items depicted by the images. The servicing module 222 may track the progress of the picker as the picker collects items for an order and may transmit progress updates to the user client device 100 that describe which items have been collected for the user's order.

In some embodiments, the servicing module 222 tracks the location of the picker within the retailer location. The servicing module 222 uses sensor data from the picker client device 110 or from sensors in the retailer location to determine the location of the picker in the retailer location. The servicing module 222 may transmit, to the picker client device 110, instructions to display a map of the retailer location indicating where in the retailer location the picker is located. Additionally, the servicing module 222 may instruct the picker client device 110 to display the locations of items for the picker to collect, and may further display navigation instructions for how the picker can travel from their current location to the location of a next item to collect for an order.

The servicing module 222 determines when the picker has collected all of the items for an order. For example, the servicing module 222 may receive a message from the picker client device 110 indicating that all of the items for an order have been collected. Alternatively, the servicing module 222 may receive item identifiers for items collected by the picker and determine when all of the items in an order have been collected. When the servicing module 222 determines that the picker has completed an order, the servicing module 222 transmits the delivery location for the order to the picker client device 110. The servicing module 222 may also transmit navigation instructions to the picker client device 110 that specify how to travel from the retailer location to the delivery location, or to a subsequent retailer location for further item collection. The servicing module 222 tracks the location of the picker as the picker travels to the delivery location for an order, and updates the user with the location of the picker so that the user can track the progress of the order. In some embodiments, the servicing module 222 computes an estimated time of arrival of the picker at the delivery location and provides the estimated time of arrival to the user.

In some embodiments, the communication module 223 facilitates communication between the user client device 100 and the picker client device 110. As noted above, a user may use a user client device 100 to send a message to the picker client device 110. The communication module 223 receives the message from the user client device 100 and transmits the message to the picker client device 110 for presentation to the picker. The picker may use the picker client device 110 to send a message to the user client device 100 in a similar manner. The compensation module 224 coordinates payment by the user for the order. The compensation module 224 uses payment information provided by the user (e.g., a credit card number or a bank account) to receive payment for the order. In some embodiments, the compensation module 224 stores the payment information for use in subsequent orders by the user. The compensation module 224 computes a total cost for the order and charges the user that cost. The compensation module 224 may provide a portion of the total cost to the picker for servicing the order, and another portion of the total cost to the retailer.

The compensation module 224 also may provide compensation to an expert picker or other expert for assisting a picker to whom an order was assigned with collecting an item included in the order. The compensation module 224 may do so in response to receiving information indicating that the expert picker or other expert assisted the assigned picker with collecting the item. For example, in response to receiving feedback from a picker client device 110 associated with a picker to whom an order was assigned indicating that an expert picker assisted the assigned picker with collecting an item included in the order, the compensation module 224 may provide compensation to the expert picker. Compensation may be provided as an incentive to assist with collecting an item and may be provided in various forms (e.g., monetary) or amounts. For example, compensation may correspond to a monetary amount or an amount of credit that may be used towards future orders placed with the online concierge system 140. As an additional example, to incentivize expert pickers or other experts to assist with collecting items, compensation in the form of points that may be used towards earning a badge (e.g., an "Expert in Produce" badge) or achieving a tier, a level, a rank, etc., may be awarded to expert pickers/experts who are the quickest to provide assistance. As an additional example, if an expert is an employee at a retailer location, compensation provided to the employee may correspond to a bonus. The compensation module 224 may provide compensation to an expert picker or other expert based on picker data associated with the picker or retailer data associated with the expert (e.g., stored payment information, such as a bank account, describing how the picker, employee, or other individual may be paid for assisting with collecting an item).

The preference module 225 may retrieve various types of data (e.g., user data, item data, order data, recipe data, etc.) from the data store 240. For example, the preference module 225 may retrieve a set of user data for a user or a set of order data associated with the user including historical order information associated with the user. In this example, the retrieved data may describe previous orders placed by the user, such as items included in each order or information associated with each order explicitly provided by the user (e.g., instructions for collecting the items or a review for the order), if any. In this example, the set of retrieved data also may include information indicating whether one or more items were removed from or replaced in each order, whether each order was associated with a complaint, a refund, an issue, a cancellation, etc. Continuing with this example, if the set of retrieved data corresponds to a set of user data for the user, the set of retrieved data also may include historical interaction information describing items added to a shopping list associated with the user and an order in which they were added, as well as a set of dietary preferences associated with the user, demographic and household information associated with the user, etc. In the above example, the preference module 225 also may retrieve a set of recipe data describing recipes the user viewed within a threshold amount of time that one or more of the items were added to the shopping list or recipes that include ingredients matching one or more of the items added to the shopping list. In this example, if the data retrieved by the preference module 225 is associated with one or more items (e.g., item(s) included in a previous order placed by the user, item(s) added to the shopping list associated with the user, one or more of the user's favorite items, etc.), the preference module 225 also may retrieve a set of item data for each item.

Data that the preference module 225 retrieves from the data store 240 may include explicit information associated with a user. Explicit information associated with a user may be received from the user and directly express the user's preference associated with an item category. For example, explicit information associated with a user corresponding to instructions received from the user to collect only organic produce directly expresses a high importance of an organic attribute associated with a "produce" item category to the user. As an additional example, explicit information associated with a user corresponding to instructions received from the user to cancel an order if a rotisserie chicken item is not available directly expresses a high importance of an availability of a set of items included in a "rotisserie chicken" item category to the user.

Data that the preference module 225 retrieves from the data store 240 also may include implicit information associated with a user. Implicit information associated with a user may be received from the user or other users and indirectly express the user's preference associated with an item category. Examples of implicit information associated with a user include: historical order information associated with the user, user data associated with other users having at least a threshold measure of similarity to the user (e.g., similar dietary preferences, demographic information, historical order information, etc.), or any other suitable types of information. For example, implicit information associated with a user corresponding to a percentage of produce previously ordered by the user that was organic indirectly expresses an importance of an organic attribute associated with a "produce" item category to the user, such that the importance may be proportional to the percentage. As an additional example, implicit information associated with a user corresponding to a percentage of orders including rotisserie chicken placed by users having at least a threshold measure of similarity to the user that were cancelled when the rotisserie chicken was not available indirectly expresses an importance of an availability of a set of items included in a "rotisserie chicken" item category to the user. In this example, the importance may be proportional to the percentage of orders that were cancelled.

The preference module 225 also predicts a measure of preference of a user associated with each item category associated with a set of items included in an order placed by the user. The preference module 225 may make the prediction based on various types of data (e.g., user data, item data, order data, recipe data, etc.) it retrieves from the data store 240 or based on any other suitable types of data. For example, the preference module 225 may predict a measure of preference of a user associated with a "bread" item category describing an importance of a gluten-free attribute of a set of items included in this item category to the user based on a set of user data for the user and a set of item data for the set of items. In this example, the measure of preference may be proportional to a percentage of previous orders placed by the user including gluten-free bread, a percentage of the previous orders in which gluten-free bread was replaced with bread containing gluten that were also associated with issues, refunds, low ratings, negative reviews, etc. In the above example, the measure of preference also may be inversely proportional to a percentage of previous orders placed by the user including bread containing gluten, a percentage of the previous orders in which gluten-free bread was replaced with bread containing gluten that were also associated with high ratings, positive reviews, etc. As an additional example, the preference module 225 may predict a measure of preference of a user associated with a "banana" item category describing an importance of an overripe attribute of a set of items included in this item category to the user based on a set of user data for the user and a set of item data for the set of items. In this example, the preference module 225 may make the prediction based on a frequency with which the user places orders including bananas, a time that the user last placed an order including bananas, and a quantity of the bananas included in the order, such that the predicted measure of preference is low if the user is likely to still have overripe bananas from this order.

The following illustrates an additional example of how the preference module 225 may predict a measure of preference of a user associated with an item category. Suppose that the preference module 225 retrieves a set of user data for a user that includes information describing items added to a shopping list associated with the user and recipe data for a recipe the user browsed within a threshold amount of time of adding the items to the shopping list. In this example, for each item in the shopping list included in an item category matching an ingredient of the recipe, the preference module 225 may predict a measure of preference of the user associated with the item category describing an importance of an availability of a set of items included in the item category to the user. In the above example, since the importance of the availability of each item is likely to be higher if the user is making the recipe than if the user is not making the recipe and the likelihood that the user is making the recipe may be proportional to a number or a percentage of items in the shopping list included in item categories matching the ingredients, the measure of preference may be proportional to the number/percentage. Alternatively, in the above example, suppose that the measure of preference of the user associated with each item category matching an ingredient of the recipe describes an importance of a freshness attribute of a set of items included in the item category to the user. In this example, suppose also that order data for previous orders placed by other users including items in item categories matching ingredients for salads were more frequently associated with instructions to collect the freshest items than previous orders placed by other users including items in item categories matching ingredients for stir-fries. Continuing with this example, the measure of preference may be higher if the recipe is for a salad than if the recipe is for a stir-fry since the order data indicates that a freshness of each item may be more important to the user if the user is making a salad rather than a stir-fry.

When predicting a measure of preference of a user associated with an item category, the preference module 225 may associate different weights with different types of information used to make the prediction. The preference module 225 may do so based on whether the measure of preference is being predicted based on explicit information or implicit information associated with the user (e.g., by weighting explicit information more heavily than implicit information). For example, suppose that user data for a user indicates that the user provided instructions when placing an order with the online concierge system 140 describing a specific ripeness and quantity the user prefers for an item corresponding to bananas (e.g., images of two green bananas, two ripe bananas, and two overripe bananas or instructions stating: "I want 2 green bananas, 2 ripe bananas, and 2 overripe bananas"). In this example, when predicting a measure of preference of the user associated with a "banana" item category describing an importance of a ripeness attribute and a quantity attribute of a set of items included in the item category to the user, the preference module 225 may weight the instructions more heavily than similar instructions provided by users having at least a threshold measure of similarity to the user. As an additional example, suppose that user data for a user includes a positive review for an order that applies to an "apple" item category, in which the review states: "Great job replacing the Gala apples with Fuji apples!" In this example, when predicting a measure of preference of the user associated with the "apple" item category describing an importance of a Fuji variety attribute and a Gala variety attribute, the preference module 225 may weight this review more heavily than historical order information associated with the user (e.g., a percentage of previous orders placed by the user including Fuji or Gala apples, reviews for the orders, etc.).

In some embodiments, the preference module 225 predicts a measure of preference of a user associated with each item category associated with a set of items included in an order placed by the user using a preference prediction model. A preference prediction model is a machine-learning model trained to predict a measure of preference of a user associated with an item category. To use the preference prediction model, the preference module 225 may access the model (e.g., from the data store 240) and apply the model to a set of inputs. The set of inputs may include various types of data retrieved by the preference module 225 described above (e.g., user data, item data, order data, recipe data, etc.). Once the preference module 225 applies the preference prediction model to the set of inputs, the preference module 225 may then receive an output from the model corresponding to a predicted measure of preference of a user associated with an item category. The output may include a value (e.g., a score, a percentage, etc.) that is proportional to the measure of preference. Once predicted, a measure of preference of a user associated with an item category may be stored among a set of user data for the user in the data store 240. In some embodiments, the preference prediction model may be trained by the machine-learning training module 230, as described below.

Once the preference module 225 predicts a measure of preference of a user associated with each item category associated with a set of items included in an order placed by the user, the preference module 225 also identifies one or more items included in the order associated with at least a threshold predicted measure of preference. For example, the preference module 225 may determine whether a predicted measure of preference of a user associated with an item category associated with an item included in an order placed by the user with the online concierge system 140 is at least a threshold predicted measure of preference (e.g., by comparing the former to the latter and making the determination based on the comparison). In this example, the preference module 225 may repeat this process for each additional item category associated with an item included in the order and then identify one or more items included in the order associated with at least the threshold predicted measure of preference.

Once the assignment module 221 assigns a picker to collect a set of items included in an order, the expertise module 226 may retrieve a set of picker data for the picker from the data store 240. For example, the expertise module 226 may retrieve a set of picker data for a picker describing how often or how long the picker has serviced orders for the online concierge system 140, a user rating for the picker, retailer locations from which the picker has collected items, preferences expressed by the picker (e.g., preferred retailers for collecting items), or the picker's previous shopping history. In this example, the picker's previous shopping history may include various types of information associated with each order including a set of items collected by the picker, such as a review for the order, a complaint, an issue, a refund, or a cancellation associated with the order, a number or a percentage of items in an item category included in the order, or a replacement or a removal of an item included in the order. In the above example, the picker's previous shopping history also may describe a rate at which one or more items included in the order were found by the picker (e.g., item(s) associated with at least a threshold predicted availability), an amount of time required by the picker to collect each item included in the order, or any other suitable types of information.

Once the expertise module 226 retrieves a set of picker data for a picker assigned to collect a set of items included in an order, the expertise module 226 may predict a level of expertise of the picker associated with collecting an item included in the order. The expertise module 226 may do so based on the set of picker data for the picker, a predicted measure of preference of a user associated with the item, or any other suitable types of data. For example, suppose that an item included in an order placed by a user corresponds to watermelon and that a predicted measure of preference of the user associated with a "watermelon" item category describes the importance of freshness, ripeness, and sweetness attributes to the user. In this example, the expertise module 226 may predict a level of expertise of a picker assigned to collect the item from a retailer location based on a set of picker data for the picker. In the above example, the level of expertise may be proportional to an amount of time the picker has serviced orders, a user rating for the picker, a number of items in the "watermelon" item category the picker has collected, a percentage of positive reviews applying to the "watermelon" item category associated with previous orders including items the picker has collected, etc. In this example, the level of expertise also may be inversely proportional to a number of complaints, refunds, cancellations, or other issues associated with previous orders including items in the "watermelon" item category the picker has collected.

To illustrate an additional example of how the expertise module 226 may predict a level of expertise of a picker associated with collecting an item included in an order, in the above example, suppose that the predicted measure of preference of the user describes the importance of an availability of a set of items included in the "watermelon" item category to the user. In this example, the level of expertise may be proportional to a number of items the picker has collected from the retailer location, a rate at which items in the "watermelon" item category associated with at least a threshold predicted availability at the retailer location were found by the picker, etc. In the above example, the level of expertise also may be inversely proportional to an average amount of time required by the picker to collect items in the "watermelon" item category, a rate at which items in the "watermelon" item category associated with at least a threshold predicted availability at the retailer location were not found by the picker, etc.

In various embodiments, when predicting a level of expertise of a picker associated with collecting an item included in an order, the expertise module 226 may associate various weights with different types of data used to predict the level of expertise (e.g., as the data relate to a predicted measure of preference of a user associated with the item). For example, suppose that a picker has been assigned to collect a set of items included in an order placed by a user. In this example, suppose also that a predicted measure of preference of the user associated with an item category describes an importance of an availability of a set of items included in the item category to the user. In this example, when the expertise module 226 predicts a level of expertise of the picker associated with collecting an item included in both the order and item category, it may weight a number or a percentage of items in the item category the picker collected from a retailer location from which the set of items is to be collected more heavily than reviews for orders assigned to the picker that apply to other item categories. Alternatively, in the above example, suppose that the predicted measure of preference of the user associated with the item category describes an importance of an attribute of the set of items included in the item category to the user. In this example, when predicting the level of expertise of the picker associated with collecting the item, the expertise module 226 may weight reviews (e.g., positive or negative reviews), complaints, refunds, issues, cancellations, etc. associated with orders assigned to the picker that included items in the item category more heavily than an average amount of time required by the picker to collect items in the item category.

In some embodiments, the expertise module 226 predicts a level of expertise of a picker associated with collecting an item using an expertise prediction model. An expertise prediction model is a machine-learning model (e.g., a reinforcement learning model) trained to predict a level of expertise of a picker associated with collecting an item. To use the expertise prediction model, the expertise module 226 may access the model (e.g., from the data store 240) and apply the model to a set of inputs. The set of inputs may include various types of data described above (e.g., a set of picker data for a picker, a predicted measure of preference of a user associated with an item, etc.). Once the expertise module 226 applies the expertise prediction model to the set of inputs, the expertise module 226 may then receive an output from the model corresponding to a predicted level of expertise of a picker associated with collecting an item. The output may include a value (e.g., a score, a percentage, etc.) that is proportional to the level of expertise. Once predicted, a level of expertise of a picker associated with collecting an item may be stored among a set of picker data for the picker in the data store 240. In some embodiments, the expertise prediction model may be trained by the machine-learning training module 230, as described below.

Once the expertise module 226 predicts a level of expertise of a picker associated with collecting an item included in an order, the expertise module 226 may determine whether the predicted level of expertise is less than a threshold predicted level of expertise. The expertise module 226 may do so by comparing the predicted level of expertise to the threshold predicted level of expertise and determining whether the predicted level of expertise is less than the threshold predicted level of expertise based on the comparison. In various embodiments, the expertise module 226 determines the threshold predicted level of expertise (e.g., based on a predicted measure of preference of a user associated with an item identified by the preference module 225). For example, the expertise module 226 may determine a threshold predicted level of expertise associated with collecting an item based on a predicted measure of preference of a user associated with the item, such that the threshold predicted level of expertise is proportional to the predicted measure of preference of the user.

The expertise module 226 also may determine whether a predicted level of expertise of a picker associated with collecting an item is less than a threshold predicted level of expertise in other ways. For example, if the servicing module 222 tracks the progress of a picker as the picker collects items included in an order, the expertise module 226 may determine that a predicted level of expertise of the picker associated with collecting an item is less than a threshold predicted level of expertise if the picker takes more than a threshold amount of time to collect the item. As an additional example, suppose that the servicing module 222 receives an image of an item from a picker client device 110 (e.g., a smart shopping cart) associated with a picker and applies computer-vision techniques to the image to identify the item. In this example, if the item does not match any item included in an order assigned to the picker and the progress of the picker indicates they have one more item to collect and that they have taken more than a threshold amount of time to collect it, the expertise module 226 may determine that a predicted level of expertise of the picker associated with collecting the item is less than a threshold predicted level of expertise.

Responsive to determining that a predicted level of expertise of a picker associated with collecting an item is less than a threshold predicted level of expertise, the expertise module 226 may retrieve picker data for a set of pickers and identify, from the set of pickers, an expert picker for collecting the item based on a set of picker data for the expert picker. The expertise module 226 may do so by predicting a level of expertise of each picker in a manner analogous to that described above and identifying an expert picker based on the predicted level of expertise. For example, for each picker included among a set of pickers, the expertise module 226 may predict a level of expertise associated with collecting an item (e.g., using the expertise prediction model) and identify an expert picker from the set of pickers such that the predicted level of expertise of the identified picker is the highest. Alternatively, in the above example, the expertise module 226 may compare the predicted level of expertise of each picker to a threshold predicted level of expertise and identify an expert picker from the set of pickers if it determines that the predicted level of expertise of the identified picker is at least the threshold predicted level of expertise based on the comparison. In various embodiments, an expert picker for collecting an item may be scheduled to be at a retailer location during specific days or times (e.g., during peak times).

In some embodiments, the expertise module 226 also may identify an expert picker for collecting an item based on additional types of information, such as information describing a predicted measure of preference of a user associated with the item, a proximity of the expert picker to a retailer location from which the item is to be collected, or any other suitable types of information. For example, suppose that a user has placed an order including items corresponding to mangos and that information describing a predicted measure of preference of the user associated with a "mango" item category describes an importance of freshness, ripeness, and sweetness attributes to the user. In the above example, the expertise module 226 may identify an expert picker for collecting mangos based on picker data associated with a set of pickers. In this example, since it may be difficult to collect mangos with these attributes without holding, touching, or smelling them, the expertise module 226 also may identify the expert picker based on a proximity of each picker to a retailer location from which the mangos are to be collected, such that the expert picker is more likely to be closer in proximity to the retailer location than other pickers. In this example, the proximity of each picker to the retailer location may be determined based on a distance between the retailer location and a geographical location associated with each picker (e.g., a geographical location of a picker client device 110 associated with each picker).

In various embodiments, if the expertise module 226 determines that a predicted level of expertise of a picker associated with collecting an item is less than a threshold predicted level of expertise, the expertise module 226 identifies an expert other than an expert picker for collecting the item. In such embodiments, the expertise module 226 identifies the expert from a set of employees or other individuals who may be available to assist with collecting items at a retailer location from which the item is to be collected. The expertise module 226 may do so by retrieving retailer data for the retailer location describing the set of employees/individuals and identifying the expert in a manner analogous to that described above with respect to identifying an expert picker. For example, the expertise module 226 may predict a level of expertise of each employee/individual and identify an employee/individual associated with a highest predicted level of expertise or at least a threshold predicted level of expertise. In various embodiments, an expert for collecting an item may be scheduled to be at a retailer location during specific days or times (e.g., during peak times).

Once the expertise module 226 identifies an expert picker or other expert for collecting an item, the prompting module 227 may generate and send a prompt to a picker client device 110 associated with the expert picker or a client device associated with the other expert to assist with collecting the item (e.g., as a push notification). For example, once the expertise module 226 identifies an expert picker for collecting an item, the prompting module 227 may generate and send a prompt to a picker client device 110 associated with the expert picker to assist a picker assigned to collect the item with collecting the item. A prompt may include interactive elements (e.g., buttons) allowing an expert picker or other expert to agree to assist with collecting an item, as well as suggestions as to how they may assist a picker to whom an order was assigned with collecting an item (e.g., by meeting the assigned picker at a retailer location from which the item is to be collected, by communicating with the assigned picker via text, phone call, video call, etc.). Furthermore, a prompt may describe compensation that may be provided to an expert picker or other expert as an incentive to assist a picker to whom an order was assigned with collecting an item included in the order (e.g., by describing a type or an amount of compensation).

The prompting module 227 may generate or send a prompt to a picker client device 110 associated with an expert picker or to a client device associated with another expert to assist a picker assigned to collect a set of items included in an order based on a location or a progress of the assigned picker. For example, the servicing module 222 may track the location of a picker assigned to collect a set of items included in an order via a picker client device 110 associated with the assigned picker to determine when the assigned picker arrives at a retailer location from which the set of items is to be collected or it may track the progress of the assigned picker as the assigned picker collects the set of items at the retailer location. In this example, the prompting module 227 may generate or send a prompt to a picker client device 110 associated with an expert picker to assist with collecting an item included in the order based on the location of the assigned picker, such that the prompt is generated or sent to the picker client device 110 when the assigned picker arrives at the retailer location. Alternatively, in the above example, the prompting module 227 may generate or send the prompt to the picker client device 110 associated with the expert picker based on the progress of the assigned picker, such that the prompt is generated or sent to the picker client device 110 associated with the expert picker when the assigned picker is collecting the item.

The feedback module 228 may receive feedback from a picker client device 110 associated with a picker to whom an order was assigned indicating that an expert picker or other expert assisted the assigned picker with collecting an item included in the order. The feedback may describe a level of helpfulness of assistance provided by the expert picker or other expert with collecting the item. For example, the feedback module 228 may receive feedback from a picker client device 110 associated with a picker to whom an order was assigned in the form of a score or other value that is proportional to a level of helpfulness of assistance provided by an expert picker or other expert with collecting an item included in the order. In this example, the feedback may be received in response to a questionnaire, a survey, etc. the feedback module 228 generates and sends to the picker client device 110 associated with the assigned picker. Feedback received from a picker client device 110 describing a level of helpfulness of assistance provided by an expert picker or other expert with collecting an item may be collected by the data collection module 200 and stored in the data store 240 (e.g., among picker data associated with the expert picker or retailer data associated with a retailer location associated with the expert).

In some embodiments, the feedback module 228 sends a request to a user client device 100 associated with a user to provide a review for an order placed by the user. The feedback module 228 may do so by sending the request in the form of a questionnaire, a survey, etc. A review for an order may include a rating for the order (e.g., a numerical rating) and additional information (e.g., text, images, or videos) describing a reason for the rating (e.g., whether a picker who collected items included in the order followed instructions for collecting the items, replacing items, etc., an accuracy of the items collected, etc.). In various embodiments, a user may be incentivized to provide a review or certain elements of a review. For example, a user may receive a credit that may be applied towards future orders placed with the online concierge system 140 if they provide a review for an order. In the above example, if the review describes an issue with the order, the user may receive additional credits for providing images or additional information describing the issue in more detail.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the preference module 225 accesses and applies a preference prediction model to predict a measure of preference of a user associated with an item category, the machine-learning training module 230 may train the preference prediction model. The machine-learning training module 230 may train the preference prediction model via supervised learning or using any other suitable technique or combination of techniques based on various types of data (e.g., user data, item data, order data, recipe data, etc.) stored in the data store 240. For example, suppose that the machine-learning training module 230 receives a set of training examples including various attributes of users of the online concierge system 140, such as historical order or interaction information associated with each user (e.g., previous orders placed by each user, recipes accessed by each user, etc.), each user's shopping preferences, favorite items, dietary restrictions/preferences, etc. In the above example, the set of training examples also may include attributes of items the users previously ordered, such as item categories, brands, ingredients, versions/varieties, etc. associated with the items, or attributes of recipes with which the users previously interacted, such as a set of ingredients included in each recipe, an amount or a quantity of each ingredient used to make each recipe, a set of equipment used to make each recipe, etc. In this example, the machine-learning training module 230 also may receive labels which represent expected outputs of the preference prediction model, in which a label indicates a measure of preference of a user associated with an item category and may be expressed as a value that is proportional to the measure of preference. Continuing with this example, the machine-learning training module 230 may then train the preference prediction model based on the attributes, as well as the labels by comparing its output from input data of each training example to the label for the training example.

In embodiments in which the expertise module 226 accesses and applies an expertise prediction model to predict a level of expertise of a picker, an employee, or other individual associated with collecting an item, the machine-learning training module 230 may train the expertise prediction model. The machine-learning training module 230 may do so via reinforcement learning or using any other suitable technique or combination of techniques based on various types of data (e.g., picker data, retailer data, user data, etc.) stored in the data store 240. For example, suppose that the machine-learning training module 230 receives picker data for pickers of the online concierge system 140. In the above example, the picker data may describe each order including a set of items collected by a picker, such as information describing items included in the order, a removal or a replacement of an item included in the order, a review for the order, a complaint, a refund, an issue, or a cancellation associated with the order, a predicted measure of preference of a user associated with an item included in the order, etc. In this example, the picker data also may describe a rate at which an item associated with at least a threshold predicted availability was found by the picker, an amount of time required by the picker to collect an item, a level of helpfulness of assistance provided by the picker with collecting an item, a proximity of the picker to a retailer location, a predicted level of expertise of the picker associated with collecting an item, etc. Continuing with this example, the expertise prediction model may learn from this information to maximize overall long-term rewards to achieve an optimal solution. In this example, complaints, refunds, cancellations, or other issues associated with orders may be penalized, while positive reviews for pickers, helpfulness of assistance provided by pickers with collecting items, etc. may be rewarded. In the above example, if the machine-learning training module 230 receives retailer data for a retailer location, the expertise prediction model may learn in an analogous manner.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, picker data, recipe data, and retailer data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Prompting an Expert to Provide Assistance with Collecting an Item

Figure 3:
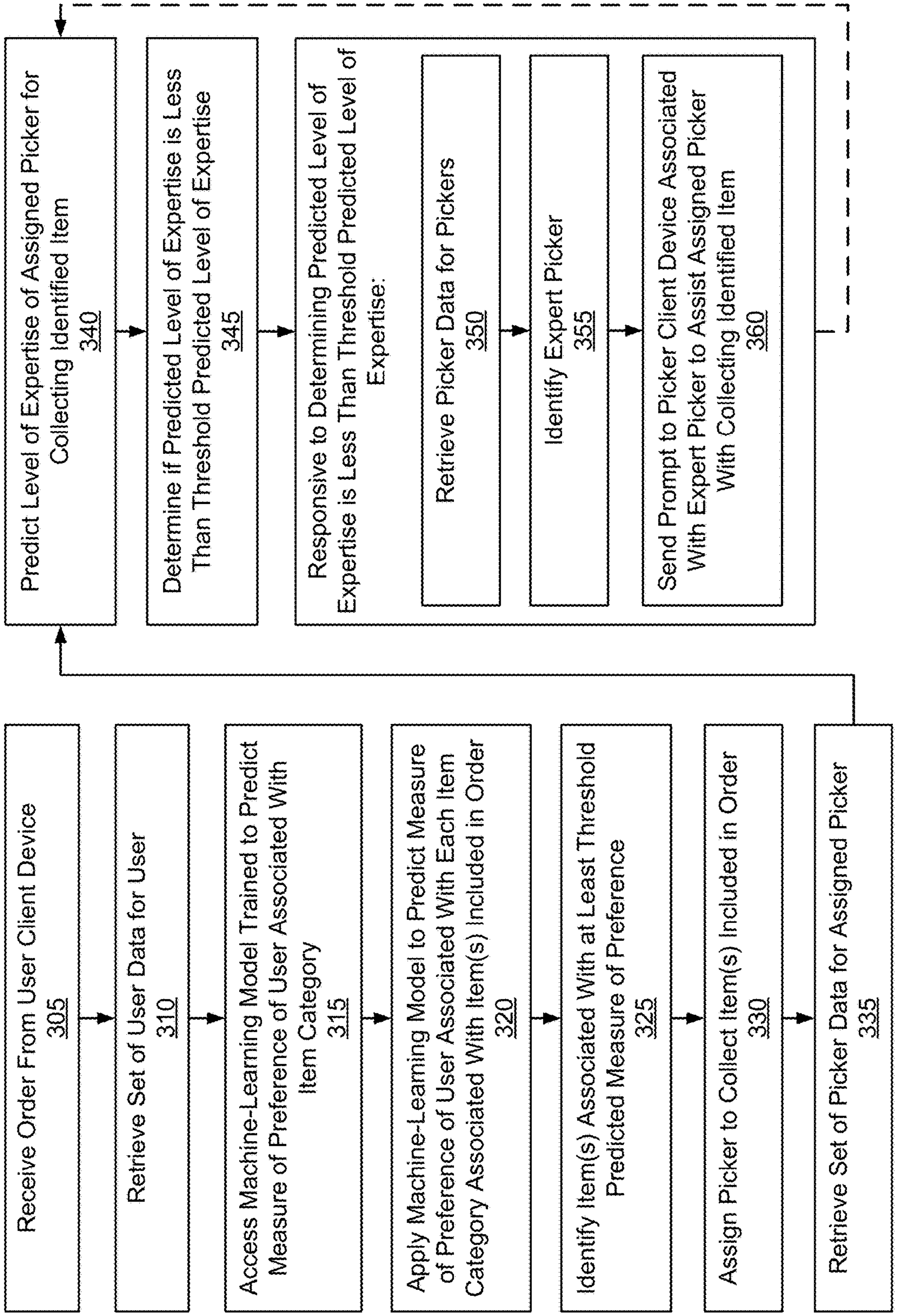
FIG. 3 is a flowchart of a method for prompting an expert to provide assistance with collecting an item included in an order placed with an online concierge system, in accordance with one or more embodiments.

FIG. 3 is a flowchart of a method for prompting an expert to provide assistance with collecting an item included in an order placed with an online concierge system 140, in accordance with one or more embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system 140 without human intervention.

The online concierge system 140 receives 305 (e.g., via the assignment module 221) an order including a set of items from a user client device 100 associated with a user of the online concierge system 140. The order received 305 by the online concierge system 140 may include order data for the set of items included in the order (e.g., a size, a brand, a quantity, etc. of each item) and information describing a delivery location for the order, the user associated with the order, a retailer location from which the user wants the set of items collected, or a timeframe within which the user wants the order delivered. The order also may include instructions (e.g., delivery or item collection instructions) provided by the user. For example, if the order includes bananas, the order also may include instructions associated with the bananas describing a specific ripeness the user prefers.

Figure 4A:
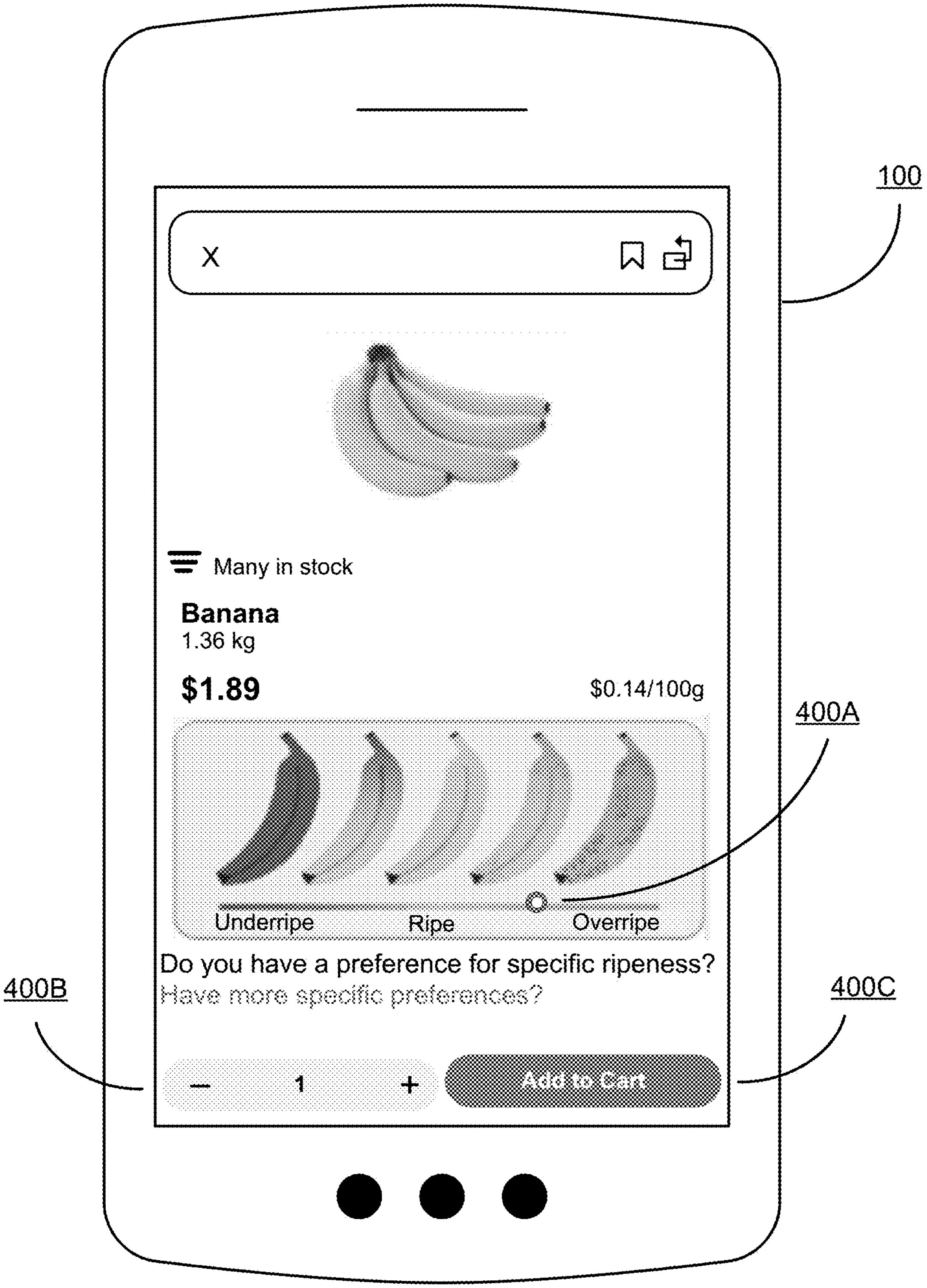
FIGS. 4A-4B illustrate examples of a user interface for receiving information describing a preference of a user associated with an item category, in accordance with one or more embodiments.
Figure 4B:
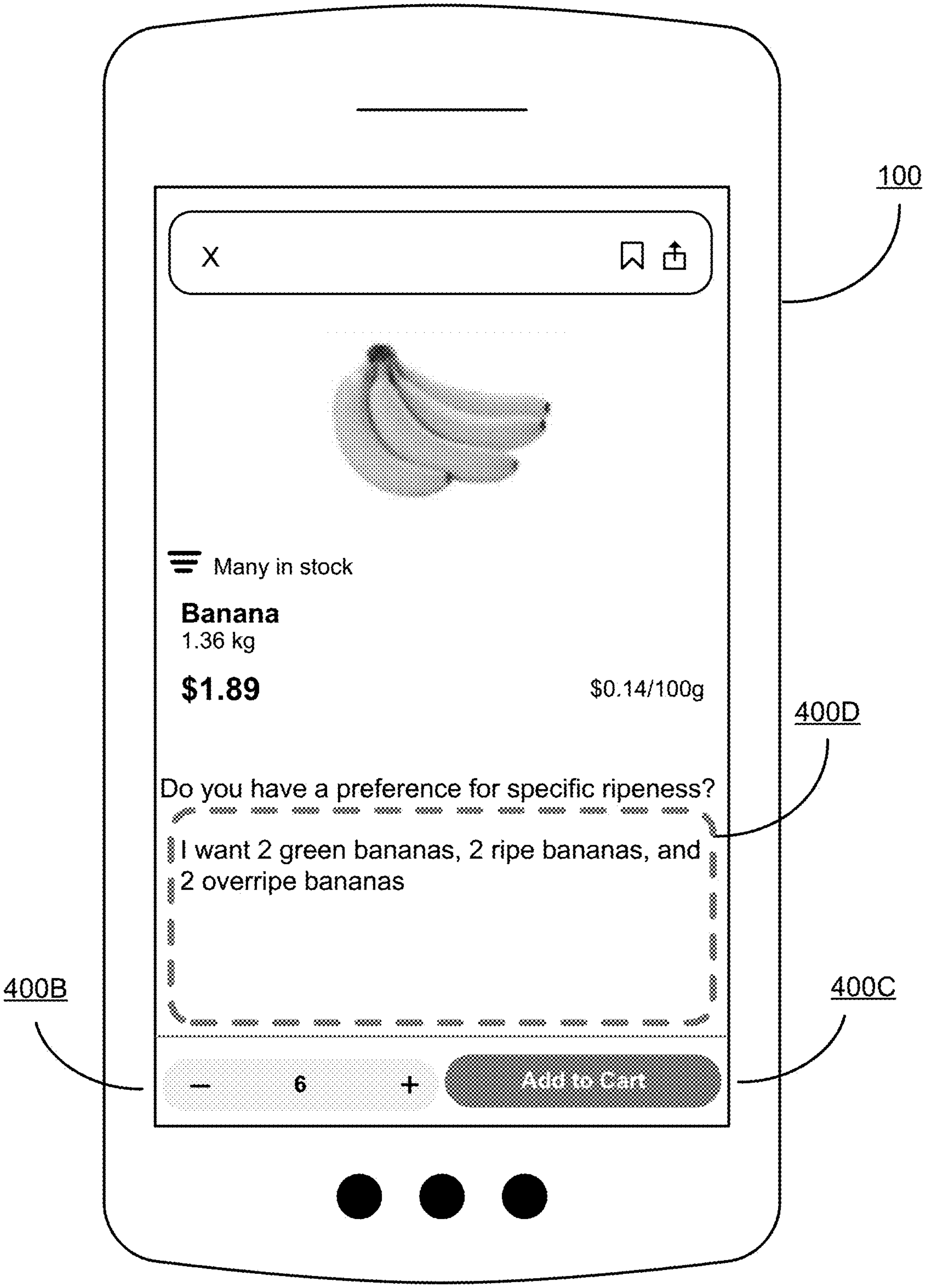

In embodiments in which the order includes instructions provided by the user, the instructions may be provided via an ordering interface generated and transmitted to the user client device 100 by the online concierge system 140 (e.g., using the content presentation module 210). The ordering interface may include interactive elements (e.g., sliders, text fields, buttons, etc.) that allow the user to provide the instructions. FIGS. 4A-4B illustrate examples of a user interface for receiving information describing a preference of a user associated with an item category, in accordance with one or more embodiments. As shown in FIG. 4A, if the online concierge system 140 populates the ordering interface with bananas that the user may select for adding to their order, the ordering interface may include images of bananas of different ripeness and a slider 400A below the images that allows the user to indicate their preference for a specific ripeness. Alternatively, as shown in FIG. 4B, the ordering interface may include a text field 400D that allows the user to describe their preference for a specific ripeness (e.g., "I want 2 green bananas, 2 ripe bananas, and 2 overripe bananas"). In the above examples, the ordering interface also may include buttons 400B-C that allow the user to specify a number of bananas to add to their order.

Referring back to FIG. 3, the online concierge system 140 then retrieves 310 (e.g., using the preference module 225) a set of user data for the user (e.g., from the data store 240). In some embodiments, the online concierge system 140 also retrieves (step 310) additional types of data (e.g., user data for other users of the online concierge system 140, item data, order data, recipe data, etc. from the data store 240). For example, the online concierge system 140 may retrieve 310 the set of user data for the user or a set of order data associated with the user including historical order information associated with the user. In this example, the retrieved data may describe previous orders placed by the user, such as items included in each order or information associated with each order explicitly provided by the user (e.g., instructions for collecting the items or a review for the order), if any. In this example, the retrieved data also may include information indicating whether one or more items were removed from or replaced in each order, whether each order was associated with a complaint, a refund, an issue, a cancellation, etc. Continuing with this example, the set of user data for the user also may include historical interaction information describing items added to a shopping list associated with the user and an order in which they were added, as well as a set of dietary preferences associated with the user, demographic and household information associated with the user, etc. In the above example, the online concierge system 140 also may retrieve 310 a set of recipe data describing recipes the user viewed within a threshold amount of time that one or more of the items were added to the shopping list or recipes that include ingredients matching one or more of the items added to the shopping list. In this example, if the retrieved data is associated with one or more items (e.g., item(s) included in a previous order placed by the user), the online concierge system 140 also may retrieve 310 a set of item data for each item.

The data retrieved 310 by the online concierge system 140 may include explicit information associated with the user. Explicit information associated with the user may be received from the user and directly express the user's preference associated with an item category. For example, explicit information associated with the user corresponding to instructions received from the user to collect only organic produce directly expresses a high importance of an organic attribute associated with a "produce" item category to the user. As an additional example, explicit information associated with the user corresponding to instructions received from the user to cancel the order if a rotisserie chicken item is not available directly expresses a high importance of an availability of a set of items included in a "rotisserie chicken" item category to the user.

The data retrieved 310 by the online concierge system 140 also may include implicit information associated with the user. Implicit information associated with the user may be received from the user or other users and indirectly express the user's preference associated with an item category. Examples of implicit information associated with the user include: historical order information associated with the user, user data associated with other users having at least a threshold measure of similarity to the user (e.g., similar dietary preferences, demographic information, historical order information, etc.), or any other suitable types of information. For example, implicit information associated with the user corresponding to a percentage of produce previously ordered by the user that was organic indirectly expresses an importance of an organic attribute associated with a "produce" item category to the user, such that the importance may be proportional to the percentage. As an additional example, implicit information associated with the user corresponding to a percentage of orders including rotisserie chicken placed by users having at least a threshold measure of similarity to the user that were cancelled when the rotisserie chicken was not available indirectly expresses an importance of an availability of a set of items included in a "rotisserie chicken" item category to the user. In this example, the importance may be proportional to the percentage of orders that were cancelled.

The online concierge system 140 may then predict (e.g., using the preference module 225) a measure of preference of the user associated with each item category associated with the set of items included in the order placed by the user. The online concierge system 140 may do so based on the set of user data for the user or other data it retrieves 310 or based on any other suitable types of data. For example, if the order includes gluten-free bread, the online concierge system 140 may predict a measure of preference of the user associated with a "bread" item category describing an importance of a gluten-free attribute of a set of items included in this item category to the user based on a set of user data for the user and a set of item data for the set of items. In this example, the measure of preference may be proportional to a percentage of previous orders placed by the user including gluten-free bread, a percentage of the previous orders in which gluten-free bread was replaced with bread containing gluten that were also associated with issues, refunds, low ratings, negative reviews, etc. In the above example, the measure of preference also may be inversely proportional to a percentage of previous orders placed by the user including bread containing gluten, a percentage of the previous orders in which gluten-free bread was replaced with bread containing gluten that were also associated with high ratings, positive reviews, etc. As an additional example, if the order includes overripe bananas, the online concierge system 140 may predict a measure of preference of the user associated with a "banana" item category describing an importance of an overripe attribute of a set of items included in this item category to the user based on a set of user data for the user and a set of item data for the set of items. In this example, the online concierge system 140 may make the prediction based on a frequency with which the user places orders including bananas, a time that the user last placed an order including bananas, and a quantity of the bananas included in the order, such that the predicted measure of preference is low if the user is likely to still have overripe bananas from this order.

The following illustrates an additional example of how the online concierge system 140 may predict a measure of preference of the user associated with an item category. Suppose that the data retrieved 310 by the online concierge system 140 includes the set of user data for the user, which includes information describing items added to a shopping list associated with the user, and recipe data for a recipe the user browsed within a threshold amount of time of adding the items to the shopping list. In this example, if the items added to the shopping list are included in the order placed by the user, for each item in the shopping list included in an item category matching an ingredient of the recipe, the online concierge system 140 may predict a measure of preference of the user associated with the item category describing an importance of an availability of a set of items included in the item category to the user. In the above example, since the importance of the availability of each item is likely to be higher if the user is making the recipe than if the user is not making the recipe and the likelihood that the user is making the recipe may be proportional to a number or a percentage of items in the shopping list included in item categories matching the ingredients, the measure of preference may be proportional to the number/percentage. Alternatively, in the above example, suppose that the measure of preference of the user associated with each item category matching an ingredient of the recipe describes an importance of a freshness attribute of a set of items included in the item category to the user. In this example, suppose also that order data for previous orders placed by other users including items in item categories matching ingredients for salads were more frequently associated with instructions to collect the freshest items than previous orders placed by other users including items in item categories matching ingredients for stir-fries. Continuing with this example, the measure of preference may be higher if the recipe is for a salad than if the recipe is for a stir-fry since the order data indicates that a freshness of each item may be more important to the user if the user is making a salad rather than a stir-fry.

When predicting a measure of preference of the user associated with an item category, the online concierge system 140 may associate (e.g., using the preference module 225) different weights with different types of information used to make the prediction. The online concierge system 140 may do so based on whether the measure of preference is being predicted based on explicit information or implicit information associated with the user (e.g., by weighting explicit information more heavily than implicit information). For example, suppose that the set of user data for the user indicates that the user provided instructions when placing the order with the online concierge system 140 describing a specific ripeness and quantity the user prefers for an item corresponding to bananas (e.g., images of two green bananas, two ripe bananas, and two overripe bananas or instructions stating: "I want 2 green bananas, 2 ripe bananas, and 2 overripe bananas"). In this example, when predicting a measure of preference of the user associated with a "banana" item category describing an importance of a ripeness attribute and a quantity attribute of a set of items included in the item category to the user, the online concierge system 140 may weight the instructions more heavily than similar instructions provided by users having at least a threshold measure of similarity to the user. As an additional example, suppose that the set of user data for the user includes a positive review for an order that applies to an "apple" item category, in which the review states: "Great job replacing the Gala apples with Fuji apples!" In this example, when predicting a measure of preference of the user associated with the "apple" item category describing an importance of a Fuji variety attribute and a Gala variety attribute, the online concierge system 140 may weight this review more heavily than historical order information associated with the user (e.g., a percentage of previous orders placed by the user including Fuji or Gala apples, reviews for the orders, etc.).

Figure 5A:
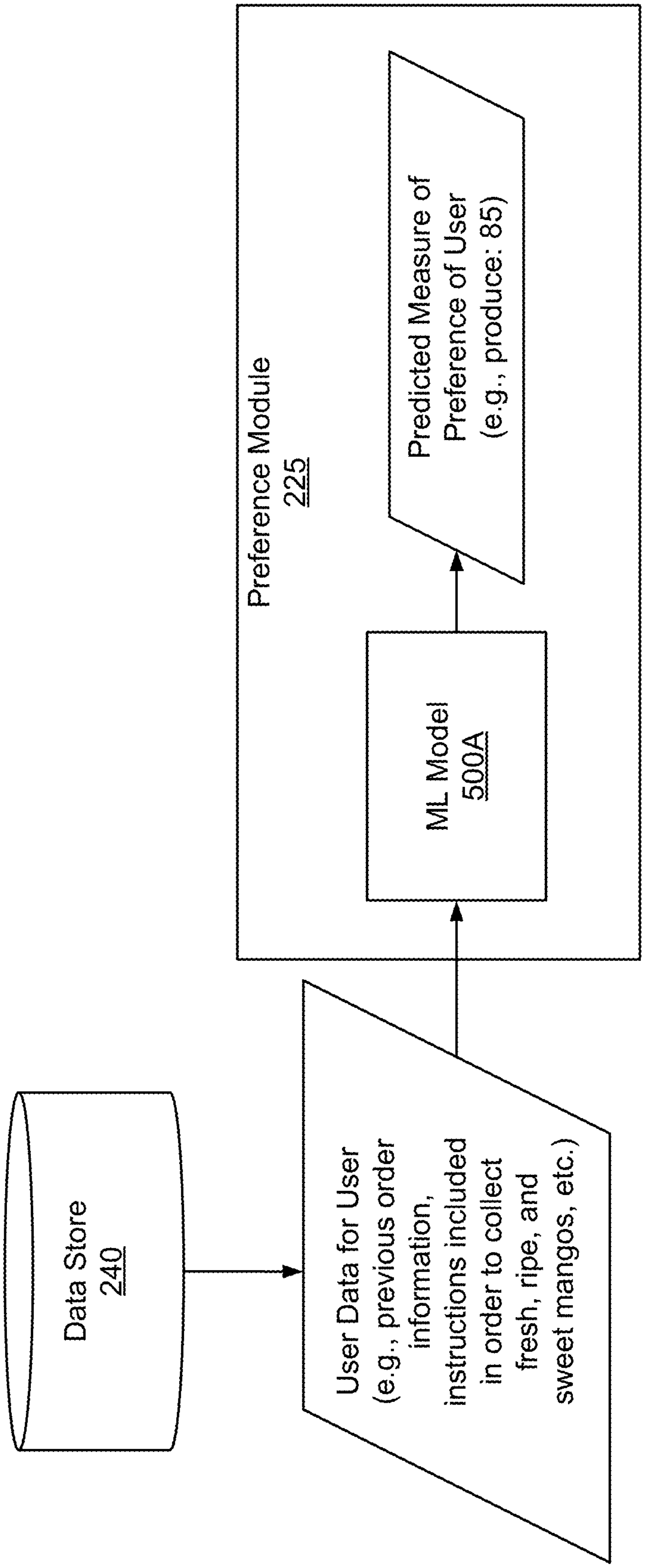
FIG. 5A is a process flow diagram for predicting a measure of preference of a user associated with an item category, in accordance with one or more embodiments.

In some embodiments, the online concierge system 140 predicts a measure of preference of the user associated with each item category associated with the set of items included in the order using a preference prediction model. A preference prediction model is a machine-learning model trained to predict a measure of preference of a user associated with an item category. To use the preference prediction model, the online concierge system 140 may access 315 (e.g., using the preference module 225) the model (e.g., from the data store 240) and apply 320 (e.g., using the preference module 225) the model to a set of inputs. The set of inputs may include various types of data described above (e.g., the set of user data for the user or other data retrieved 310 by the online concierge system 140). Once the online concierge system 140 applies 320 the preference prediction model to the set of inputs, the online concierge system 140 may then receive (e.g., via the preference module 225) an output from the model corresponding to a predicted measure of preference of the user associated with an item category. The output may include a value (e.g., a score, a percentage, etc.) that is proportional to the measure of preference. FIG. 5A is a process flow diagram for predicting a measure of preference of a user associated with an item category, in accordance with one or more embodiments. As shown in FIG. 5A, if the set of inputs includes instructions in the order for collecting produce (e.g., "I want fresh, ripe, and sweet mangos"), the output received from the preference prediction model 500A may include a score of 85 that is proportional to an importance of freshness, ripeness, and sweetness attributes of a set of items included in this item category to the user. In some embodiments, the preference prediction model 500A may be trained by the online concierge system 140 (e.g., using the machine-learning training module 230). Once predicted, a measure of preference of the user associated with an item category may be stored among the set of user data for the user (e.g., in the data store 240).

Referring again to FIG. 3, once the online concierge system 140 predicts a measure of preference of the user associated with each item category associated with the set of items included in the order, the online concierge system 140 identifies 325 (e.g., using the preference module 225) one or more items included in the order associated with at least a threshold predicted measure of preference. For example, the online concierge system 140 may determine (e.g., using the preference module 225) whether a predicted measure of preference of the user associated with an item category associated with an item included in the order is at least a threshold predicted measure of preference (e.g., by comparing the former to the latter and making the determination based on the comparison). In this example, the online concierge system 140 may repeat this process for each additional item category associated with an item included in the order and then identify 325 the item(s) included in the order associated with at least the threshold predicted measure of preference.

The online concierge system 140 assigns 330 (e.g., using the assignment module 221) a picker to collect the set of items included in the order. The online concierge system 140 may do so based on various types of information associated with the order or the assigned picker. For example, the online concierge system 140 may assign 330 the order to the assigned picker based on the assigned picker's location and the retailer location from which the ordered items are to be collected. In the above example, the online concierge system 140 also may assign 330 the order to the assigned picker based on how many items are in the order, a vehicle operated by the assigned picker, the delivery location, the assigned picker's preferences for how far to travel to deliver an order, the assigned picker's ratings by users, or how often the assigned picker agrees to service an order.

The online concierge system 140 retrieves 335 (e.g., using the expertise module 226) a set of picker data for the assigned picker. For example, the online concierge system 140 may retrieve 335 the set of picker data for the assigned picker (e.g., from the data store 240) describing how often or how long the assigned picker has serviced orders for the online concierge system 140, a user rating for the assigned picker, the retailer locations from which the assigned picker has collected items, preferences expressed by the assigned picker (e.g., preferred retailers for collecting items), or the assigned picker's previous shopping history. In this example, the assigned picker's previous shopping history may include various types of information associated with each order including a set of items collected by the assigned picker, such as a review for the order, a complaint, an issue, a refund, or a cancellation associated with the order, a number or a percentage of items in an item category included in the order, or a replacement or a removal of an item included in the order. In the above example, the assigned picker's previous shopping history also may describe a rate at which one or more items included in the order were found by the assigned picker (e.g., item(s) associated with at least a threshold predicted availability), an amount of time required by the assigned picker to collect each item included in the order, or any other suitable types of information.

The online concierge system 140 may then predict 340 (e.g., using the expertise module 226) a level of expertise of the assigned picker associated with collecting an item included in the order identified 325 by the online concierge system 140. The online concierge system 140 may do so based on the set of picker data for the assigned picker, a predicted measure of preference of the user associated with the item, or any other suitable types of data. For example, suppose that an identified item included in the order placed by the user corresponds to watermelon and that a predicted measure of preference of the user associated with a "watermelon" item category describes the importance of freshness, ripeness, and sweetness attributes to the user. In this example, the online concierge system 140 may predict 340 a level of expertise of the assigned picker associated with collecting the item from the retailer location based on the set of picker data for the assigned picker. In the above example, the level of expertise may be proportional to an amount of time the assigned picker has serviced orders, a user rating for the assigned picker, a number of items in the "watermelon" item category the assigned picker has collected, a percentage of positive reviews applying to the "watermelon" item category associated with previous orders including items the assigned picker has collected, etc. In this example, the level of expertise also may be inversely proportional to a number of complaints, refunds, cancellations, or other issues associated with previous orders including items in the "watermelon" item category the assigned picker has collected.

To illustrate an additional example of how the online concierge system 140 may predict 340 the level of expertise of the assigned picker associated with collecting an identified item, in the above example, suppose that the predicted measure of preference of the user describes the importance of an availability of a set of items included in the "watermelon" item category to the user. In this example, the level of expertise may be proportional to a number of items the assigned picker has collected from the retailer location, a rate at which items in the "watermelon" item category associated with at least a threshold predicted availability at the retailer location were found by the assigned picker, etc. In the above example, the level of expertise also may be inversely proportional to an average amount of time required by the assigned picker to collect items in the "watermelon" item category, a rate at which items in the "watermelon"

item category associated with at least a threshold predicted availability at the retailer location were not found by the assigned picker, etc.

In various embodiments, when predicting 340 the level of expertise of the assigned picker associated with collecting an identified item included in the order, the online concierge system 140 may associate (e.g., using the expertise module 226) various weights with different types of data used to predict 340 the level of expertise (e.g., as the data relate to a predicted measure of preference of the user associated with the item). For example, suppose that a predicted measure of preference of the user associated with an item category describes an importance of an availability of a set of items included in the item category to the user. In this example, when predicting 340 a level of expertise of the assigned picker associated with collecting an identified item included in the item category, a number or a percentage of items in the item category the assigned picker collected from the retailer location from which the set of items is to be collected may be weighted more heavily than reviews for orders assigned to the picker that apply to other item categories. Alternatively, in the above example, suppose that the predicted measure of preference of the user associated with the item category describes an importance of an attribute of the set of items included in the item category to the user. In this example, when predicting 340 the level of expertise of the assigned picker associated with collecting the item, the online concierge system 140 may weight reviews (e.g., positive or negative reviews), complaints, refunds, issues, cancellations, etc. associated with orders assigned to the assigned picker that included items in the item category more heavily than an average amount of time required by the assigned picker to collect items in the item category.

Figure 5B:
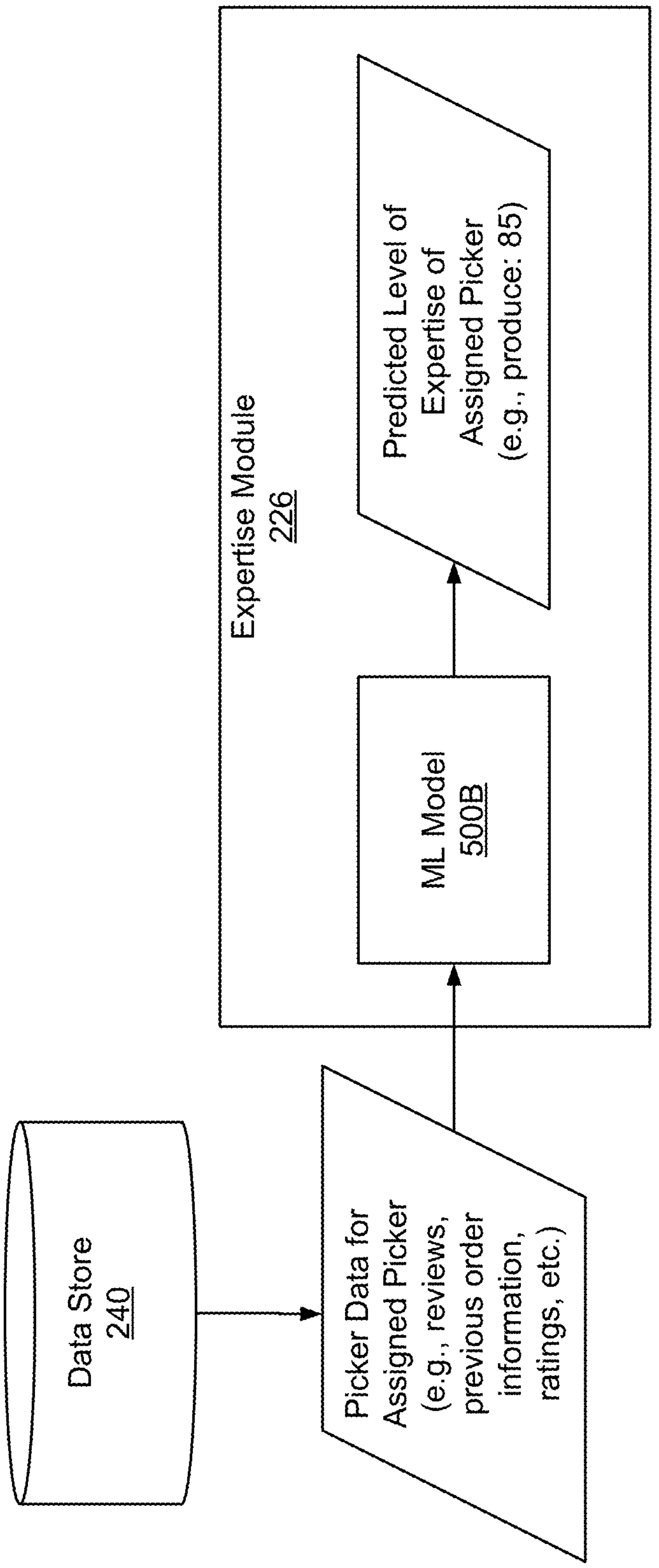
FIG. 5B is a process flow diagram for predicting a level of expertise of a picker associated with collecting an item, in accordance with one or more embodiments.

In some embodiments, the online concierge system 140 predicts 340 a level of expertise of the assigned picker associated with collecting an identified item using an expertise prediction model. An expertise prediction model is a machine-learning model (e.g., a reinforcement learning model) trained to predict 340 a level of expertise of a picker associated with collecting an item. To use the expertise prediction model, the online concierge system 140 may access (e.g., using the expertise module 226) the model (e.g., from the data store 240) and apply (e.g., using the expertise module 226) the model to a set of inputs. The set of inputs may include various types of data described above (e.g., a set of picker data for the assigned picker, a predicted measure of preference of the user associated with an identified item, etc.). FIG. 5B is a process flow diagram for predicting 340 a level of expertise of a picker associated with collecting an item, in accordance with one or more embodiments. As shown in FIG. 5B, which continues the example described above in conjunction with FIG. 5A, the set of inputs to the expertise prediction model 500B may include the set of picker data for the assigned picker, such as reviews for previous orders including items collected by the assigned picker, order information associated with these orders (e.g., information describing the items, quantities of the items, etc.), ratings for these orders, etc. Once the online concierge system 140 applies the expertise prediction model 500B to the set of inputs, the online concierge system 140 may then receive (e.g., via the expertise module 226) an output from the model 500B corresponding to a predicted level of expertise of the assigned picker associated with collecting an identified item. The output may include a value (e.g., a score, a percentage, etc.) that is proportional to the level of expertise. For example, as shown in FIG. 5B, the output may include a score that is proportional to a predicted level of expertise of the assigned picker associated with collecting an identified item (e.g., a score of 85 for an identified item corresponding to mangos included in a "produce" item category). In some embodiments, the expertise prediction model 500B may be trained by the online concierge system 140 (e.g., using the machine-learning training module 230). Once predicted, a level of expertise of the assigned picker associated with collecting an identified item may be stored among a set of picker data for the assigned picker (e.g., in the data store 240).

Referring back to FIG. 3, once the online concierge system 140 predicts 340 a level of expertise of the assigned picker associated with collecting an identified item included in the order, the online concierge system 140 may determine 345 (e.g., using the expertise module 226) whether the predicted level of expertise is less than a threshold predicted level of expertise. The online concierge system 140 may do so by comparing (e.g., using the expertise module 226) the predicted level of expertise to the threshold predicted level of expertise and determining 345 whether the predicted level of expertise is less than the threshold predicted level of expertise based on the comparison. In various embodiments, the online concierge system 140 determines (e.g., using the expertise module 226) the threshold predicted level of expertise (e.g., based on a predicted measure of preference of the user associated with the identified item). For example, the online concierge system 140 may determine a threshold predicted level of expertise associated with collecting an identified item based on a predicted measure of preference of the user associated with the item, such that the threshold predicted level of expertise is proportional to the predicted measure of preference of the user.

The online concierge system 140 also may determine 345 whether a predicted level of expertise of the assigned picker associated with collecting an identified item is less than the threshold predicted level of expertise in other ways. For example, if the online concierge system 140 tracks (e.g., using the servicing module 222) the progress of the assigned picker as they collect items included in the order, the online concierge system 140 may determine 345 that a predicted level of expertise of the assigned picker associated with collecting an identified item is less than the threshold predicted level of expertise if the assigned picker takes more than a threshold amount of time to collect the item. As an additional example, suppose that the online concierge system 140 receives (e.g., via the servicing module 222) an image of an item from a picker client device 110 (e.g., a smart shopping cart) associated with the assigned picker and applies computer-vision techniques to the image to identify the item. In this example, if the item does not match any item included in the order and the progress of the assigned picker indicates they have one more item to collect and that they have taken more than a threshold amount of time to collect it, the online concierge system 140 may determine 345 that a predicted level of expertise of the assigned picker associated with collecting the item is less than the threshold predicted level of expertise.

Responsive to determining 345 that a predicted level of expertise of the assigned picker associated with collecting an identified item is less than the threshold predicted level of expertise, the online concierge system 140 may retrieve 350 (e.g., using the expertise module 226) picker data for a set of pickers. The online concierge system 140 may then identify 355 (e.g., using the expertise module 226), from the set of pickers, an expert picker for collecting the identified item based on a set of picker data for the expert picker. The online concierge system 140 may do so by predicting 340 a level of expertise of each picker in a manner analogous to that described above and identifying 355 the expert picker based on the predicted level of expertise. For example, for each picker included among the set of pickers, the online concierge system 140 may predict 340 a level of expertise associated with collecting an identified item (e.g., using the expertise prediction model 500B) and identify 355 the expert picker from the set of pickers such that the predicted level of expertise of the identified picker is the highest. Alternatively, in the above example, the online concierge system 140 may compare the predicted level of expertise of each picker to the threshold predicted level of expertise and identify 355 the expert picker from the set of pickers if it determines 345 that the predicted level of expertise for the identified picker is at least the threshold predicted level of expertise based on the comparison. In various embodiments, an expert picker for collecting an item may be scheduled to be at the retailer location during specific days or times (e.g., during peak times).

Figure 5C:
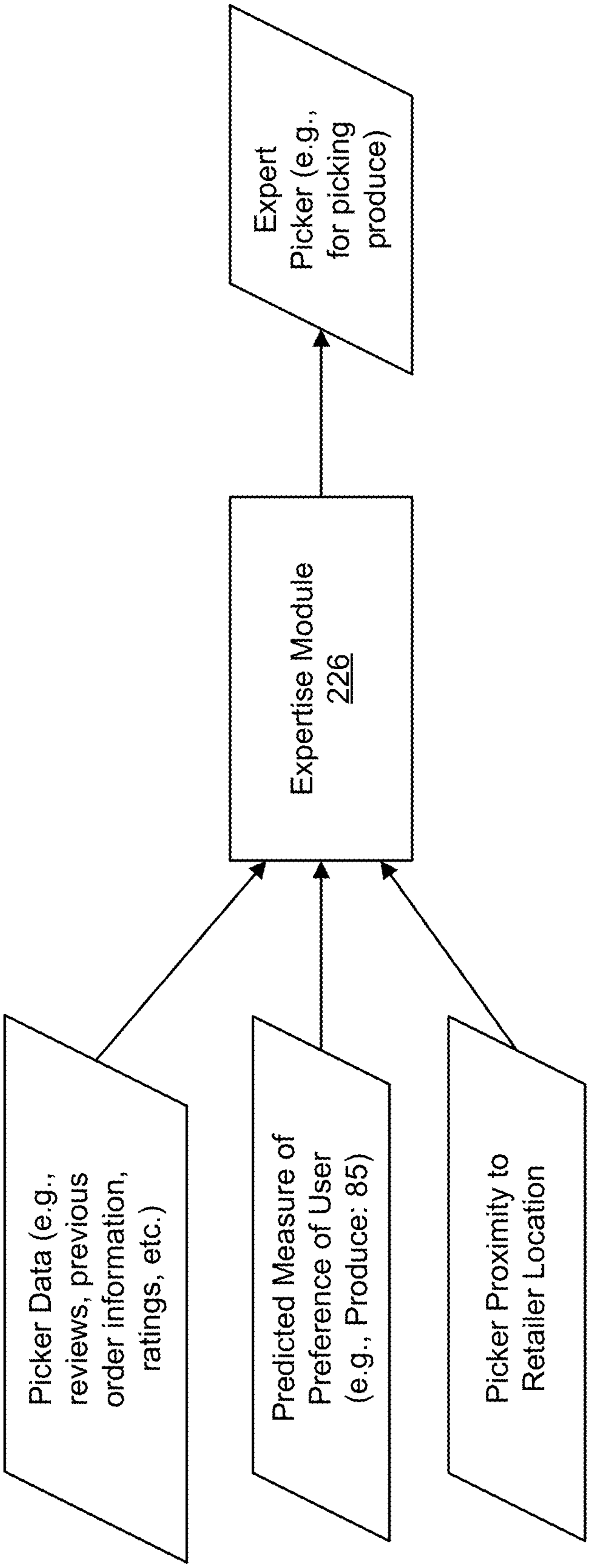
FIG. 5C is a process flow diagram for identifying an expert picker for collecting an item, in accordance with one or more embodiments.

In some embodiments, the online concierge system 140 also may identify 355 the expert picker for collecting an identified item based on additional types of information, such as information describing a predicted measure of preference of the user associated with the item, a proximity of the expert picker to the retailer location, or any other suitable types of information. FIG. 5C is a process flow diagram for identifying 355 an expert picker for collecting an item, in accordance with one or more embodiments, and continues the examples described above in conjunction with FIGS. 5A-5B. As shown in the example of FIG. 5C, suppose that the order placed by the user includes an identified item corresponding to mangos and that information describing a predicted measure of preference of the user associated with a "produce" item category describes an importance of freshness, ripeness, and sweetness attributes to the user. In the above example, the online concierge system 140 may identify 355 an expert picker for collecting produce based on picker data associated with a set of pickers. In this example, since it may be difficult to collect mangos with these attributes without holding, touching, or smelling them, the online concierge system 140 also may identify 355 the expert picker based on a proximity of each picker to the retailer location from which the mangos are to be collected, such that the expert picker is more likely to be closer in proximity to the retailer location than other pickers. In this example, the proximity of each picker to the retailer location may be determined based on a distance between the retailer location and a geographical location associated with each picker (e.g., a geographical location of a picker client device 110 associated with each picker).

In various embodiments, if the online concierge system 140 determines 345 that a predicted level of expertise of the assigned picker associated with collecting an identified item is less than the threshold predicted level of expertise, the online concierge system 140 identifies 355 an expert other than an expert picker for collecting the identified item. In such embodiments, the online concierge system 140 identifies 355 the expert from a set of employees or other individuals who may be available to assist with collecting items at the retailer location from which the item is to be collected. The online concierge system 140 may do so by retrieving 350 retailer data for the retailer location describing the set of employees/individuals and identifying 355 the expert in a manner analogous to that described above with respect to identifying 355 an expert picker. For example, the online concierge system 140 may predict 340 a level of expertise of each employee/individual and identify 355 an employee/individual associated with a highest predicted level of expertise or at least a threshold predicted level of expertise. In various embodiments, an expert for collecting an item may be scheduled to be at the retailer location during specific days or times (e.g., during peak times).

Referring once more to FIG. 3, once the online concierge system 140 identifies 355 an expert picker or other expert for collecting an identified item, the online concierge system 140 may generate (e.g., using the prompting module 227) a prompt to assist with collecting the item. The online concierge system 140 may then send 360 (e.g., using the prompting module 227) the prompt to a picker client device 110 associated with the expert picker or a client device associated with the other expert (e.g., as a push notification). For example, once the online concierge system 140 identifies 355 an expert picker for collecting an identified item, the online concierge system 140 may generate and send 360 the prompt to a picker client device 110 associated with the expert picker to assist the assigned picker with collecting the identified item. The prompt may include interactive elements (e.g., buttons) allowing the expert picker or other expert to agree to assist the assigned picker with collecting an identified item, as well as suggestions as to how they may assist the assigned picker with collecting the identified item (e.g., by meeting the assigned picker at the retailer location, by communicating with the assigned picker via text, phone call, video call, etc.). Furthermore, the prompt may describe compensation that may be provided to the expert picker or other expert as an incentive to assist the assigned picker with collecting an identified item (e.g., by describing a type or an amount of compensation).

The online concierge system 140 may generate or send 360 the prompt to the picker client device 110 associated with the expert picker or to a client device associated with another expert to assist the assigned picker based on a location or a progress of the assigned picker. For example, the online concierge system 140 may track (e.g., using the servicing module 222) the location of the assigned picker via a picker client device 110 associated with the assigned picker to determine when the assigned picker arrives at the retailer location from which the set of items is to be collected or it may track the progress of the assigned picker as the assigned picker collects the set of items at the retailer location. In this example, the online concierge system 140 may generate or send 360 the prompt to a picker client device 110 associated with the expert picker to assist with collecting an identified item included in the order based on the location of the assigned picker, such that the prompt is generated or sent 360 to the picker client device 110 when the assigned picker arrives at the retailer location. Alternatively, in the above example, the online concierge system 140 may generate or send 360 the prompt to the picker client device 110 associated with the expert picker based on the progress of the assigned picker, such that the prompt is generated or sent 360 to the picker client device 110 associated with the expert picker when the assigned picker is collecting the identified item. In embodiments in which the online concierge system 140 identifies (step 325) multiple items included in the order associated with at least the threshold predicted measure of preference, the online concierge system 140 may repeat some of the steps described above (e.g., by proceeding back to the predicting 340 a level of expertise of the assigned picker associated with collecting each additional identified item step, etc.).

The online concierge system 140 may receive (e.g., via the feedback module 228) feedback from a picker client device 110 associated with the assigned picker indicating that the expert picker or other expert assisted the assigned picker with collecting an identified item included in the order. The feedback may describe a level of helpfulness of assistance provided by the expert picker or other expert with collecting the item. For example, the online concierge system 140 may receive feedback from a picker client device 110 associated with the assigned picker in the form of a score or other value that is proportional to a level of helpfulness of assistance provided by the expert picker or other expert with collecting an identified item included in the order. In this example, the feedback may be received in response to a questionnaire, a survey, etc. the online concierge system 140 generates (e.g., using the feedback module 228) and sends (e.g., using the feedback module 228) to the picker client device 110 associated with the assigned picker. The feedback may be collected by the online concierge system 140 (e.g., using the data collection module 200) and stored (e.g., in the data store 240 among picker data associated with the expert picker or retailer data associated with a retailer location associated with the expert).

In embodiments in which the prompt describes compensation that may be provided to the expert picker or other expert, the online concierge system 140 may provide (e.g., using the compensation module 224) the compensation to the expert picker or other expert for assisting the assigned picker with collecting an identified item. The online concierge system 140 may do so in response to receiving information indicating that the expert picker or other expert assisted the assigned picker with collecting the identified item. For example, in response to receiving feedback from a picker client device 110 associated with the assigned picker indicating that the expert picker assisted the assigned picker with collecting an identified item included in the order, the online concierge system 140 may provide compensation to the expert picker. Compensation may be provided as an incentive to assist with collecting an item and may be provided in various forms (e.g., monetary) or amounts. For example, compensation may correspond to a monetary amount or an amount of credit that may be used towards future orders placed with the online concierge system 140. As an additional example, to incentivize expert pickers or other experts to assist with collecting items, compensation in the form of points that may be used towards earning a badge (e.g., an "Expert in Produce" badge) or achieving a tier, a level, a rank, etc., may be awarded to expert pickers/experts who are the quickest to provide assistance. As an additional example, if an expert is an employee at a retailer location, compensation provided to the employee may correspond to a bonus. The online concierge system 140 may provide compensation to the expert picker or other expert based on picker data associated with the picker or retailer data associated with the expert (e.g., stored payment information, such as a bank account, describing how the picker, employee, or other individual may be paid for assisting with collecting an item).

In some embodiments, the online concierge system 140 sends (e.g., using the feedback module 228) a request to the user client device 100 associated with the user to provide a review for the order. The online concierge system 140 may do so by sending the request in the form of a questionnaire, a survey, etc. The review for the order may include a rating for the order (e.g., a numerical rating) and additional information (e.g., text, images, or videos) describing a reason for the rating (e.g., whether the assigned picker followed instructions for collecting the set of items, replacing items, etc., an accuracy of the set of items collected, etc.). In various embodiments, the user may be incentivized to provide the review or certain elements of the review. For example, the user may receive a credit that may be applied towards future orders placed with the online concierge system 140 if they provide a review for the order. In the above example, if the review describes an issue with the order, the user may receive additional credits for providing images or additional information describing the issue in more detail.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, from a user client device associated with a user of an online concierge system, an order comprising a set of items;

retrieving a set of user data for the user;

accessing a first machine-learning model trained to predict a measure of preference of the user associated with an item category, wherein the first machine-learning model is trained by:

receiving user data for a plurality of users of the online concierge system, wherein the user data includes historical orders by users, historical instances of items added to user's orders, and implicit information associated with users, the implicit information including user data associated with other users having at least a threshold measure of similarity to the user, receiving, for each user of the plurality of users, a label describing the measure of preference of a corresponding user associated with an item category, and training the first machine-learning model based at least in part on the user data and the label for each user of the plurality of users;

applying the first machine-learning model to predict a measure of preference of the user associated with each item category associated with the set of items based at least in part on the set of user data for the user;

identifying an item of the set of items associated with at least a threshold predicted measure of preference;

assigning a picker associated with the online concierge system to collect the set of items included in the order;

retrieving a set of picker data for the assigned picker;

dynamically computing a threshold predicted level of expertise for the identified item, wherein the threshold predicted level of expertise for the identified item is proportional to the predicted measure of preference of the user associated with the identified item output by the first machine-learning model;

applying a second machine-learning model to the set of picker data, the predicted measure of preference of the user associated with the identified item, and the threshold predicted level of expertise for the identified item to predict a level of expertise of the assigned picker in association with collecting the identified item;

determining whether the predicted level of expertise of the assigned picker in association with collecting the identified item is less than the threshold predicted level of expertise for the identified item; and responsive to determining that the predicted level of expertise of the assigned picker in association with collecting the identified item is less than the threshold predicted level of expertise for the identified item:

retrieving picker data for a set of pickers associated with the online concierge system, applying the second machine-learning model to the picker data of the sets of pickers and the predicted measure of preference of the user associated with the identified item to predict a level of expertise of each of the pickers in the set in association with collecting the identified item;

identifying an expert picker from the set of pickers, wherein the expert picker is associated with a highest level of expertise predicted for the pickers in the set, and sending, to a picker client device associated with the expert picker, a prompt to assist the assigned picker with collecting the identified item.

2. The method of claim 1, wherein applying the first machine-learning model based at least in part on the set of user data for the user comprises applying the first machine-learning model based at least in part on one or more of: historical order information associated with the user or a set of instructions associated with collecting the set of items.

3. The method of claim 1, wherein sending, to the picker client device associated with the expert picker, the prompt to assist the assigned picker with collecting the identified item comprises:

tracking a progress of the assigned picker as the picker collects the set of items included in the order; and sending, to the picker client device associated with the expert picker, the prompt to assist the assigned picker with collecting the identified item based at least in part on the progress of the assigned picker.

4. The method of claim 1, further comprising:

responsive to determining the level of expertise of the assigned picker associated with collecting the identified item is less than the threshold predicted level of expertise for the identified item, retrieving retailer data for a retailer location associated with the order;

identifying an expert associated with the retailer location based at least in part on the retailer data for the retailer location; and sending, to a client device associated with the expert, the prompt to assist the assigned picker with collecting the identified item.

5. The method of claim 1, further comprising:

receiving feedback from an additional picker client device describing a level of helpfulness of assistance provided by the expert picker with collecting the identified item; and including the feedback among the set of picker data for the expert picker.

6. The method of claim 1, wherein applying the first machine-learning model to predict the measure of preference of the user associated with each item category associated with the set of items further comprises:

retrieving a set of recipe data describing a set of recipes the user viewed within a threshold amount of time of adding the set of items to a shopping list associated with the user; and applying the first machine-learning model to predict the measure of preference of the user associated with each item category associated with the set of items based at least in part on the set of recipe data.

7. The method of claim 1, further comprising:

responsive to receiving information indicating the expert picker assisted the assigned picker with collecting the identified item, providing compensation to the expert picker.

8. A computer program product comprising a non-transitory computer-readable storage medium having instructions encoded thereon that, when executed by a processor, cause the processor to perform steps comprising:

receiving, from a user client device associated with a user of an online concierge system, an order comprising a set of items;

retrieving a set of user data for the user;

accessing a first machine-learning model trained to predict a measure of preference of the user associated with an item category, wherein the first machine-learning model is trained by:

receiving user data for a plurality of users of the online concierge system, wherein the user data includes historical orders by users, historical instances of items added to user's orders, and implicit information associated with users, the implicit information including user data associated with other users having at least a threshold measure of similarity to the user, receiving, for each user of the plurality of users, a label describing the measure of preference of a corresponding user associated with an item category, and training the first machine-learning model based at least in part on the user data and the label for each user of the plurality of users;

applying the first machine-learning model to predict a measure of preference of the user associated with each item category associated with the set of items based at least in part on the set of user data for the user;

identifying an item of the set of items associated with at least a threshold predicted measure of preference;

assigning a picker associated with the online concierge system to collect the set of items included in the order;

retrieving a set of picker data for the assigned picker;

dynamically computing a threshold predicted level of expertise for the identified item, wherein the threshold predicted level of expertise for the identified item is proportional to the predicted measure of preference of the user associated with the identified item output by the first machine-learning model;

applying a second machine-learning model to the set of picker data, the predicted measure of preference of the user associated with the identified item, and the threshold predicted level of expertise for the identified item to predict a level of expertise of the assigned picker in association with collecting the identified item;

determining whether the predicted level of expertise of the assigned picker in association with collecting the identified item is less than the threshold predicted level of expertise for the identified item; and responsive to determining that the predicted level of expertise of the assigned picker in association with collecting the identified item is less than the threshold predicted level of expertise for the identified item:

retrieving picker data for a set of pickers associated with the online concierge system, applying the second machine-learning model to the picker data of the sets of pickers and the predicted measure of preference of the user associated with the identified item to predict a level of expertise of each of the pickers in the set in association with collecting the identified item;

identifying an expert picker from the set of pickers, wherein the expert picker is associated with a highest level of expertise predicted for the pickers in the set, and sending, to a picker client device associated with the expert picker, a prompt to assist the assigned picker with collecting the identified item.

9. The computer program product of claim 8, wherein applying the first machine-learning model based at least in part on the set of user data for the user comprises applying the first machine-learning model based at least in part on one or more of: historical order information associated with the user or a set of instructions associated with collecting the set of items.

10. The computer program product of claim 8, wherein sending, to the picker client device associated with the expert picker, the prompt to assist the assigned picker with collecting the identified item comprises:

tracking a progress of the assigned picker as the picker collects the set of items included in the order; and sending, to the picker client device associated with the expert picker, the prompt to assist the assigned picker with collecting the identified item based at least in part on the progress of the assigned picker.

11. The computer program product of claim 8, wherein the computer-readable storage medium further has instructions encoded thereon that, when executed by the processor, cause the processor to perform steps comprising:

responsive to determining the level of expertise of the assigned picker associated with collecting the identified item is less than the threshold predicted level of expertise for the identified item, retrieving retailer data for a retailer location associated with the order;

identifying an expert associated with the retailer location based at least in part on the retailer data for the retailer location; and sending, to a client device associated with the expert, the prompt to assist the assigned picker with collecting the identified item.

12. The computer program product of claim 8, wherein the computer-readable storage medium further has instructions encoded thereon that, when executed by the processor, cause the processor to perform steps comprising:

receiving feedback from an additional picker client device describing a level of helpfulness of assistance provided by the expert picker with collecting the identified item; and including the feedback among the set of picker data for the expert picker.

13. The computer program product of claim 8, wherein applying the first machine-learning model to predict the measure of preference of the user associated with each item category associated with the set of items further comprises:

retrieving a set of recipe data describing a set of recipes the user viewed within a threshold amount of time of adding the set of items to a shopping list associated with the user; and applying the first machine-learning model to predict the measure of preference of the user associated with each item category associated with the set of items based at least in part on the set of recipe data.

14. A computer system comprising:
a processor; and
a non-transitory computer-readable storage medium storing instructions that, when executed by the processor, perform actions comprising:
receiving, from a user client device associated with a user of an online concierge system, an order comprising a set of items;
retrieving a set of user data for the user;
accessing a first machine-learning model trained to predict a measure of preference of the user associated with an item category, wherein the first machine-learning model is trained by:
receiving user data for a plurality of users of the online concierge system, wherein the user data includes historical orders by users, historical instances of items added to user's orders, and implicit information associated with users, the implicit information including user data associated with other users having at least a threshold measure of similarity to the user,
receiving, for each user of the plurality of users, a label describing the measure of preference of a corresponding user associated with an item category, and
training the first machine-learning model based at least in part on the user data and the label for each user of the plurality of users;
applying the first machine-learning model to predict a measure of preference of the user associated with each item category associated with the set of items based at least in part on the set of user data for the user;
identifying an item of the set of items associated with at least a threshold predicted measure of preference;
assigning a picker associated with the online concierge system to collect the set of items included in the order;
retrieving a set of picker data for the assigned picker;
dynamically computing a threshold predicted level of expertise for the identified item, wherein the threshold predicted level of expertise for the identified item is proportional to the predicted measure of preference of the user associated with the identified item output by the first machine-learning model;
applying a second machine-learning model to the set of picker data and the predicted measure of preference of the user associated with the identified item to predict a level of expertise of the assigned picker in association with collecting the identified item;
determining whether the predicted level of expertise of the assigned picker in association with collecting the identified item is less than the threshold predicted level of expertise for the identified item; and
responsive to determining that the predicted level of expertise of the assigned picker in association with collecting the identified item is less than the threshold predicted level of expertise for the identified item:
retrieving picker data for a set of pickers associated with the online concierge system,
applying a second machine-learning model to the set of picker data, the predicted measure of preference of the user associated with the identified item, and the threshold predicted level of expertise for the identified item to predict a level of expertise of the assigned picker in association with collecting the identified item;
identifying an expert picker from the set of pickers, wherein the expert picker is associated with a highest level of expertise predicted for the pickers in the set, and
sending, to a picker client device associated with the expert picker, a prompt to assist the assigned picker with collecting the identified item.

* * * * *